US011520590B2

(12) United States Patent
Haskins, Jr.

(10) Patent No.: US 11,520,590 B2
(45) Date of Patent: Dec. 6, 2022

(54) DETECTING A REPETITIVE PATTERN IN AN INSTRUCTION PIPELINE OF A PROCESSOR TO REDUCE REPEATED FETCHING

(71) Applicant: Microsoft Technology Licensing, LLC, Redmond, WA (US)

(72) Inventor: John William Haskins, Jr., Morrisville, NC (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/010,521

(22) Filed: Sep. 2, 2020

(65) Prior Publication Data

US 2022/0066782 A1    Mar. 3, 2022

(51) Int. Cl.
*G06F 9/38* (2018.01)

(52) U.S. Cl.
CPC .......... *G06F 9/3808* (2013.01); *G06F 9/3861* (2013.01); *G06F 9/3867* (2013.01)

(58) Field of Classification Search
CPC ...... G06F 9/3808; G06F 9/325; G06F 9/3867; G06F 9/3861; G06F 9/30134
See application file for complete search history.

(56) References Cited

U.S. PATENT DOCUMENTS

2007/0113057 A1   5/2007  Knoth
2012/0117362 A1   5/2012  Bhargava et al.
2013/0311759 A1*  11/2013  Abdallah ............ G06F 9/30058
                                                        712/239
2017/0177366 A1*   6/2017  Kothinti Naresh ... G06F 9/3016
2017/0277536 A1*   9/2017  Kothinti Naresh ..... G06F 9/381

OTHER PUBLICATIONS

"International Search Report and Written Opinion Issued in PCT Application No. PCT/US21/035060", dated Aug. 27, 2021, 13 Pages.

* cited by examiner

*Primary Examiner* — Courtney P Carmichael-Moody
(74) *Attorney, Agent, or Firm* — Withrow & Terranova, PLLC

(57) ABSTRACT

Exemplary aspects disclosed herein include detecting a repetitive pattern in an instruction pipeline of a processor to reduce repeated fetching. The processor includes a pattern record circuit configured to receive information in a data stream (e.g., instructions or consumed data) in the instruction pipeline. The pattern record circuit includes a first in, first out (FIFO) table circuit that contains an input record column and plurality of additional adjacent record columns. As new data occurs in the data stream, the data record circuit is configured to sequentially record next incoming data from the data stream into a next input entry of an input record column and then shift previously recorded data into adjacent entries of adjacent record columns. The distance between the input record column and the additional record column that has matching data is the distance in the data stream between a reoccurrence of data in the data stream.

22 Claims, 10 Drawing Sheets

DETECTING A REPETITIVE PATTERN IN AN INSTRUCTION PIPELINE OF A PROCESSOR TO REDUCE REPEATED FETCHING

FIELD OF THE DISCLOSURE

The technology of the disclosure relates to computer processors ("processors"), and more particularly to fetching instructions into an instruction pipeline of a processor to be executed.

BACKGROUND

Microprocessors, also known as "processors," perform computational tasks for a wide variety of applications. A microprocessor includes a central processing unit (CPU) that includes one or more processor cores, also known as "CPU cores." The CPU executes computer program instructions ("instructions"), also known as "software instructions," to perform operations based on data and generate a result, which is a produced value. The CPU can include instruction pipelining where a series of instructions are fetched into one or more instruction pipelines each having a number of processing stages to perform tasks towards their execution. This allows multiple instructions to be processed at the same time and in different stages to increase instruction processing throughput, as opposed to each instruction being processed sequentially and fully executed before processing a next instruction. In this regard, the CPU can include an instruction fetch circuit that fetches instructions into an instruction pipeline. The instructions are then subsequently decoded in a decoding stage and further processed in other pipeline stages for execution. The instructions are eventually executed in an execution stage of an instruction pipeline. Power is consumed in the CPU as a result of the instruction fetch circuit fetching instructions processed in an instruction pipeline.

Repetitive patterns can be received in an instruction pipeline of a CPU as a result of fetching and processing instructions to be executed. For example, the fetched instructions to be executed may be in a programming construct, such as a software loop. Software loops may be re-executed a number of times before the loop is exited, thus causing instructions in the loop to be repetitively fetched and processed. Not only may the same instructions be repeated, fetched, and processed in an instruction pipeline, but the data consumed for processing these instructions may also result in the repetition of data in the instruction pipeline. Each repetitive fetching of instructions into an instruction pipeline of a CPU to be processed and executed consumes power in the instruction fetch circuit of the CPU.

SUMMARY

Exemplary aspects disclosed herein include detecting a repetitive pattern in an instruction pipeline of a processor to reduce repeated fetching. The processor includes an instruction processing circuit configured to fetch instructions into an instruction pipeline as part of an instruction data stream to be processed and executed as a part of instruction pipelining. Data specified by source operands in the fetched instructions is also fetched into the instruction pipeline and used to execute the instructions in the data stream in the instruction pipeline. The instructions and/or its source data fetched into the instruction pipeline may repeat (i.e., are repetitively fetched into the instruction pipeline). In exemplary aspects, it is desired to detect these repeated patterns of data (e.g., instructions and/or source data) occurring in the instruction pipeline so that previously recorded patterns of such data can be inserted into the instruction pipeline without having to re-fetch this data.

In exemplary aspects, the processor includes a pattern record circuit. The pattern record circuit is configured to receive information in a data stream (e.g., instructions and/or source data) in the instruction pipeline. In one example, the pattern record circuit includes a first in, first out (FIFO) table circuit. The pattern record circuit contains an input record column and plurality of additional adjacent record columns. The number of record columns defines the width of the pattern record circuit. As new data occur in the data stream, a pattern record circuit is configured to sequentially record next incoming data from the data stream into a next input entry of an input record column of the pattern record circuit and then store (e.g., shift) previously recorded data into adjacent entries of adjacent record columns of the pattern record circuit. Thus, if data repeats in the data stream in a frequency equal to or less than the width of the pattern record circuit, the incoming data recorded in the input record column in the pattern record circuit will match a previous occurrence of the data previously shifted into an additional record column. The distance between the input record column and the additional record column, that includes matching data, is the distance in the data stream between a reoccurrence (i.e., repeat) of data in the data stream. The additional record columns also include respective frequency indicators that are updated by the pattern record circuit for detected matches between data in one or more additional record columns and new input data recorded in the input record column.

In this manner, the frequency indicators indicating an occurrence of a repetitive data pattern can be consulted by a pattern fetch circuit in the processor to determine potential data patterns occurring in a data stream in the instruction pipeline. Detecting a repetitive pattern in the instruction pipeline of the processor can be used to reduce repeated re-fetching. For example, the pattern fetch circuit can be configured to receive an indication of new data fetched into the instruction pipeline. The pattern fetch circuit can be configured to consult the frequency indicators previously recorded for the new fetched data to determine the likelihood that the new fetched data is the start of a previously recorded repetitive data pattern. If the new fetched data is determined to be the start of a previously recorded repetitive data pattern, the pattern fetch circuit is configured to insert the data from the previously recorded repetitive data pattern into the instruction pipeline such that the fetching of new data can be temporarily disabled.

In this regard, in one exemplary aspect, a processor is disclosed, comprising an instruction processing circuit configured to fetch data into an instruction pipeline as a data stream, and a pattern record circuit comprising an input record column comprising an input data entry, and one or more additional input record columns each comprising a data entry and a frequency indicator. The pattern record circuit is configured to receive a next incoming data from the data stream and store the next incoming data in the input data entry in the input record column. In response to receiving the next incoming data from the data stream, the pattern record circuit is also configured to store the next incoming data from the input data entry of the input record column to an additional record column among the one or more additional record columns adjacent to the input record column, and store data in each data entry of the one or more additional record columns into the data entry of a respective adjacent additional record column among the one or more additional record columns. In response to the data stored in the data entry of an additional record column among the one or more additional record columns matching the next incoming data the pattern record circuit is also configured to update a frequency indicator of the additional record column to a repetition frequency state indicating a repetition frequency of the next incoming data in the data stream.

In another exemplary aspect, a method of detecting a repetitive pattern in an instruction pipeline of a processor is disclosed. The method comprises receiving a next incoming datum from a data stream fetched into the instruction pipeline, and storing the next incoming data in an input data entry in an input record column in a pattern record circuit. The method also comprises storing the next incoming data from the input data entry of the input record column to an additional record column among one or more additional record columns in the pattern record circuit adjacent to the input record column, storing data in each data entry of the one or more additional record columns into a data entry of a respective adjacent additional record column among the one or more additional record columns, and determining if the data stored in the data entry of an additional record column among the one or more additional record columns matches the incoming data. In response to the data stored in the data entry of an additional record column among the one or more additional record columns matching the incoming data, the method also comprises updating a frequency indicator of the additional record column to a repetition frequency state indicating a repetition frequency of the incoming data in the data stream.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 1:
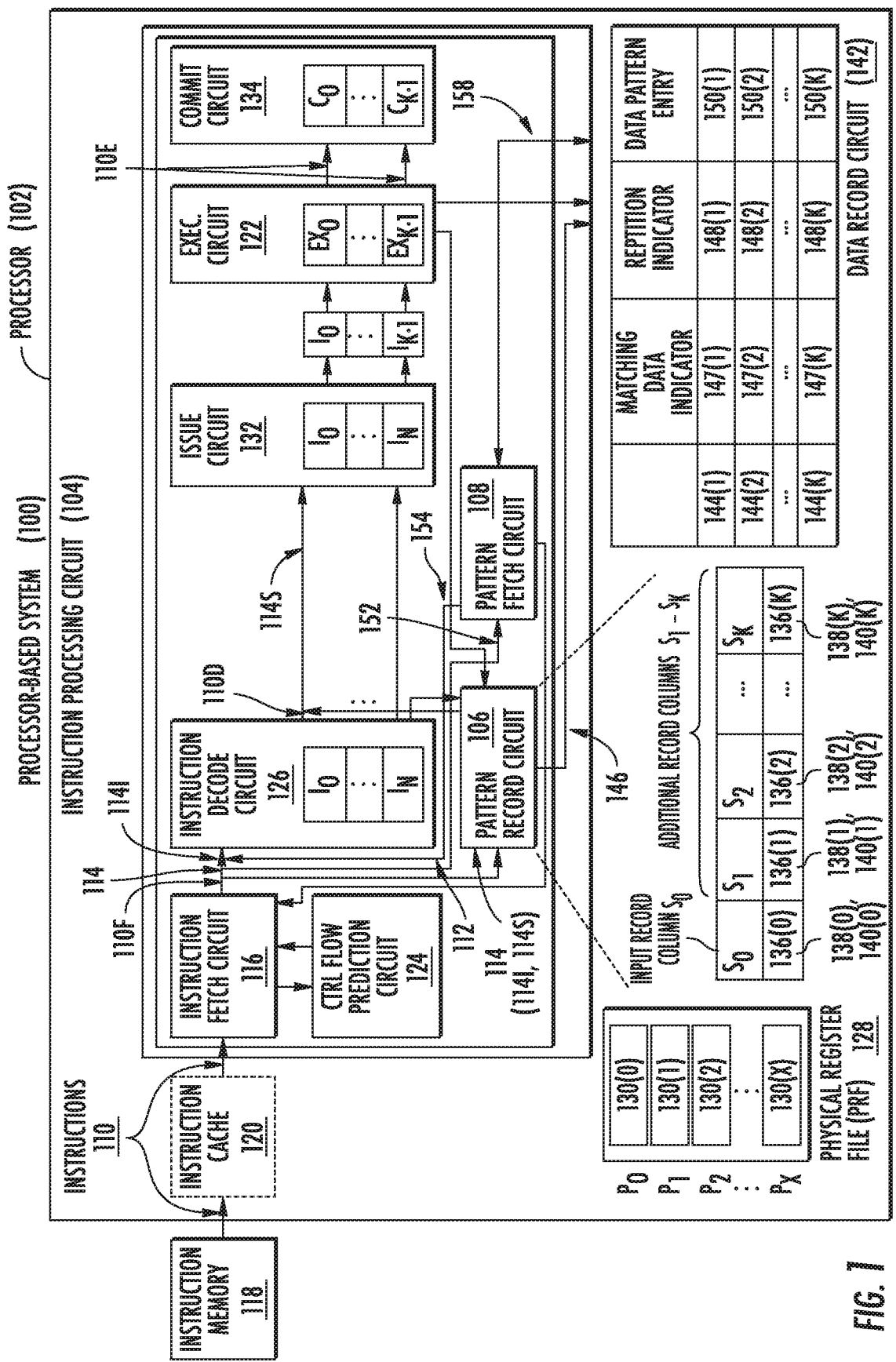
FIG. 1 is a diagram of an exemplary processor-based system that includes a processor with an instruction processing circuit that includes one or more instruction pipelines for processing computer instructions, wherein the processor is configured to detect a repetitive pattern in a data stream in the instruction pipeline of the processor to reduce repeated re-fetching.
Figure 7:
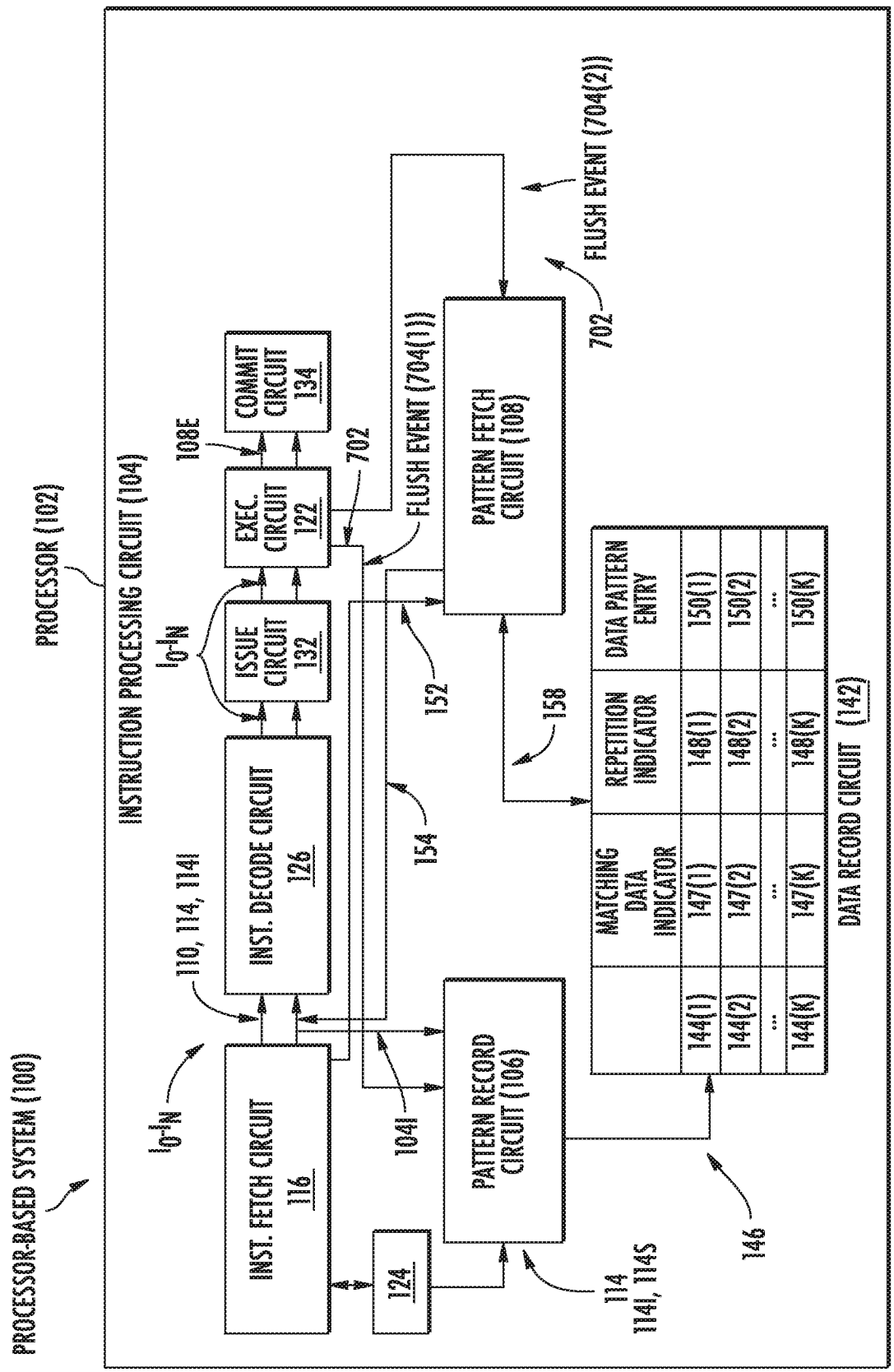
FIG. 7 is a diagram of an exemplary data record circuit that can be provided in the processor of FIG. 1 to determine that a recorded pattern does not match an issued instruction, and flush the instruction pipeline and/or the FIFO table circuit.
Figure 8:
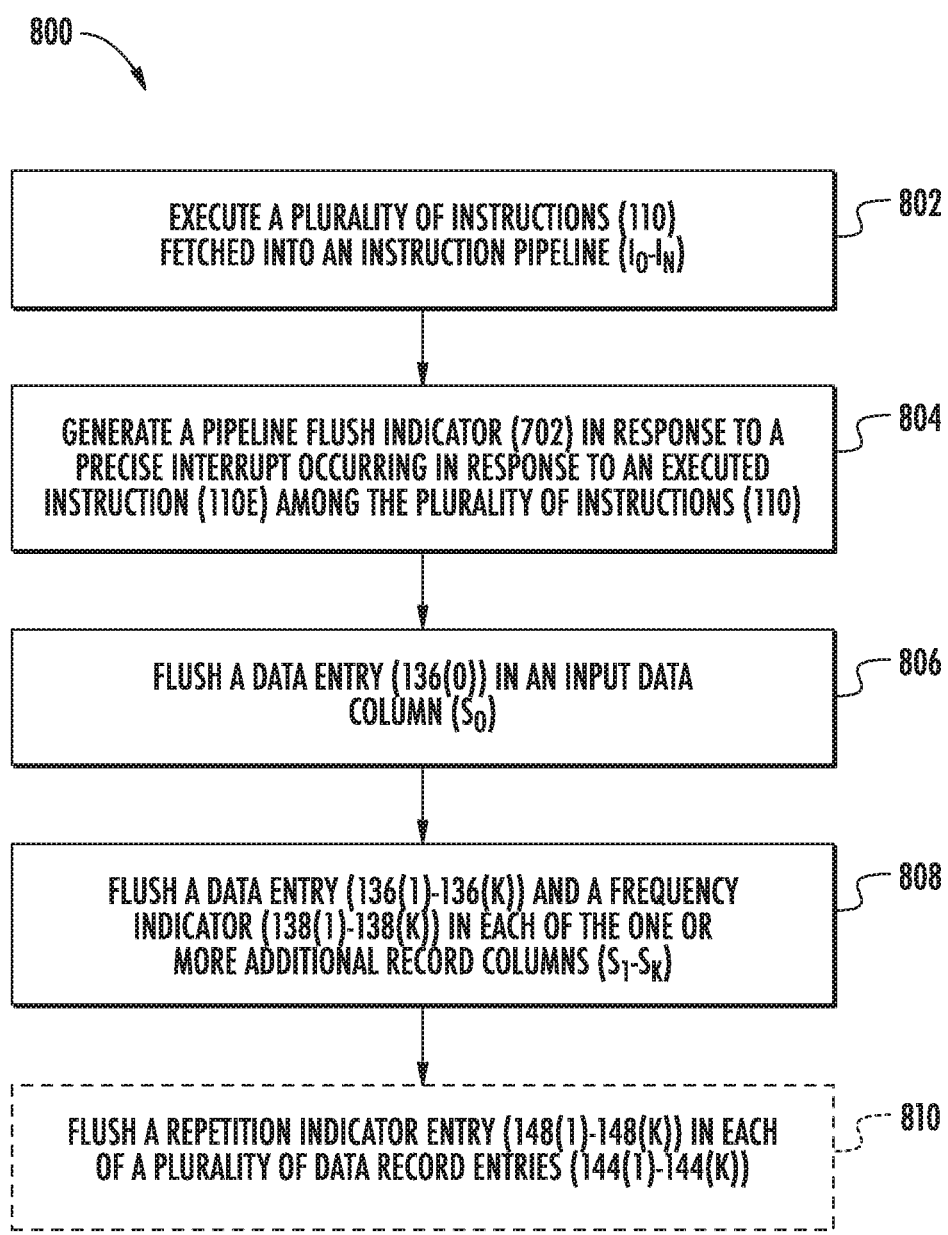
Figure 9:
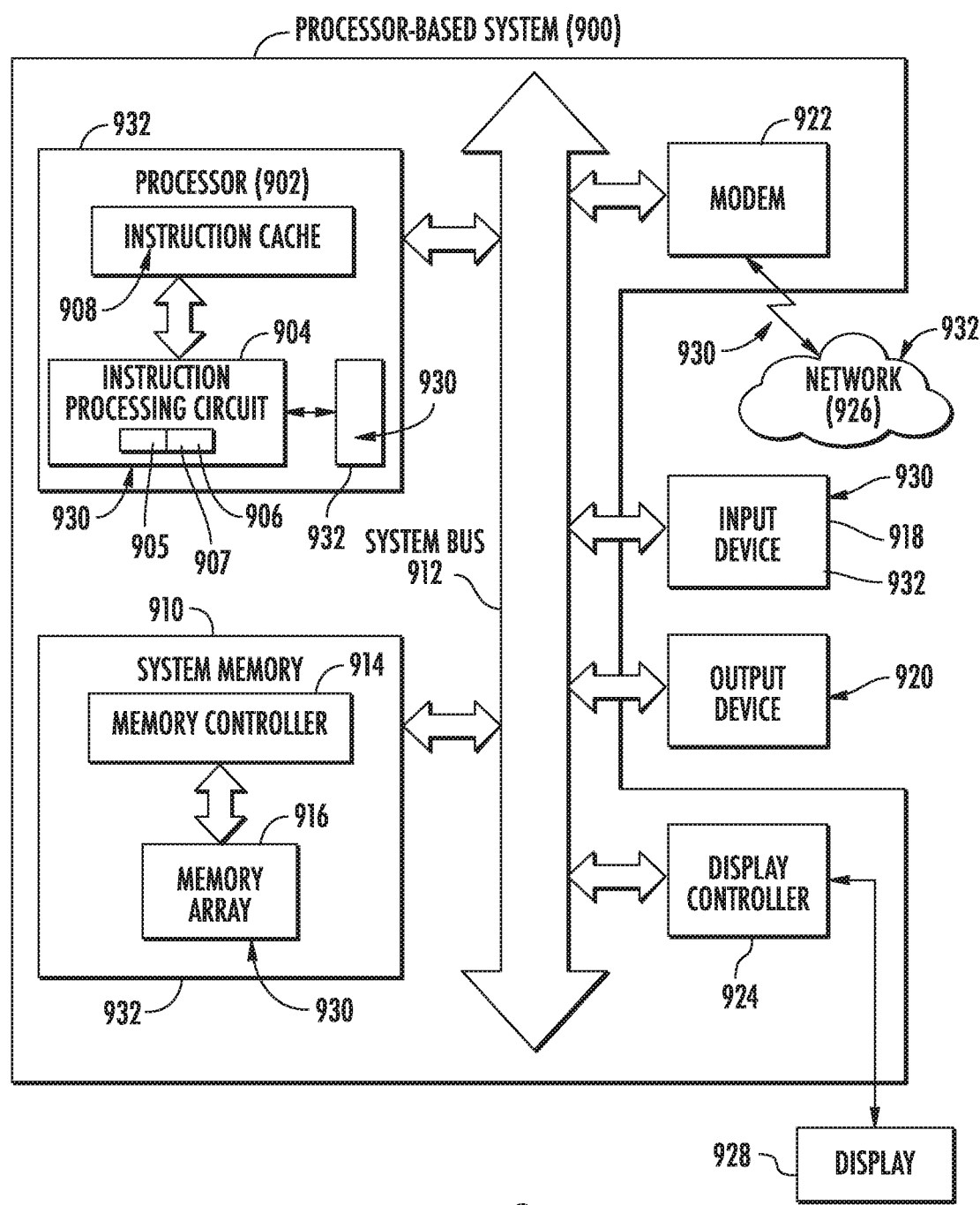

FIG. 8 is a flowchart illustrating an exemplary process of flushing the pattern record circuit and data record circuit in the processor of FIG. 1 in response to a flush event; and FIG. 9 is a block diagram of an exemplary processor-based system that includes a processor and/or its instruction processing circuit configured to detect a repetitive pattern in a data stream in the instruction pipeline of the processor to reduce repeated re-fetching, including but not limited to the exemplary processor and instruction processing circuit in FIG. 1 and the exemplary processes in FIGS. 3, 5, 7, and 8.

DETAILED DESCRIPTION

Exemplary aspects disclosed herein include detecting a repetitive pattern in an instruction pipeline of a processor to reduce repeated fetching. The processor includes an instruction processing circuit configured to fetch instructions into an instruction pipeline as part of an instruction data stream to be processed and executed as a part of instruction pipelining. Data specified by source operands in the fetched instructions is also fetched into the instruction pipeline and used to execute the instructions in the data stream in the instruction pipeline. The instructions and/or its source data fetched into the instruction pipeline may repeat (i.e. repetitively fetched into instruction pipeline). In exemplary aspects, it is desired to detect these repeated patterns of data (e.g., instructions and/or source data) occurring in the instruction pipeline so that previously recorded patterns of such data can be inserted into the instruction pipeline without having to re-fetch this data.

In this regard, in exemplary aspects, the processor includes a pattern record circuit. The pattern record circuit is configured to receive information in a data stream (e.g., instructions and/or source data) in the instruction pipeline. In one example, the pattern record circuit includes a first in, first out (FIFO) table circuit. The pattern record circuit contains an input record column and plurality of additional adjacent record columns. The number of record columns defines the width of the pattern record circuit. As new data occurs in the data stream, a pattern record circuit is configured to sequentially record next incoming data from the data stream into a next input entry of an input record column of the pattern record circuit and then store (e.g., shift) previously recorded data into adjacent entries of adjacent record columns of the pattern record circuit. Thus, if data repeats in the data stream in a frequency equal to or less than the width of the pattern record circuit, the incoming data recorded in the input record column in the pattern record circuit will match a previous occurrence of the data previously shifted into an additional record column. The distance between the input record column and the additional record column, that has matching data, is the distance in the data stream between a reoccurrence (i.e., repeat) of data in the data stream. The additional record columns also include respective frequency indicators that are updated by the pattern record circuit for detected matches between data in one or more additional record columns and new input data recorded in the input column.

In this manner, the frequency indicators indicating an occurrence of a repetitive data pattern can be consulted by a pattern fetch circuit in the processor to determine potential data patterns occurring in a data stream in the instruction pipeline. Detecting a repetitive pattern in the instruction pipeline of the processor can be used to reduce repeated re-fetching. For example, the pattern fetch circuit can be configured to receive an indication of new data fetched into the instruction pipeline. The pattern fetch circuit can be configured to consult the frequency indicators previously recorded for the new fetched data to determine the likelihood the new fetched data is the start of a previously recorded repetitive data pattern. If the new fetched data is determined to be the start of a previously recorded repetitive data pattern, the pattern fetch circuit is configured to insert the data from the previously recorded repetitive data pattern into the instruction pipeline such that the fetching of new data can be temporarily disabled.

In this regard, FIG. 1 is a schematic diagram of an exemplary processor-based system 100 that includes a processor 102. As will be discussed in more detail below, the processor 102 is configured to detect a repetitive pattern in a data stream 114 in an instruction pipeline $I_0$-$I_N$ of the processor 102 to reduce repeated re-fetching. In this example, to detect a repetitive pattern in a data stream 114 in an instruction pipeline $I_0$-$I_N$ of the processor 102, the processor 102 includes a pattern record circuit 106 and a pattern fetch circuit 108. The data stream 114 can include data as fetched instructions 110 and/or source data fetched into the instruction pipeline $I_0$-$I_N$ to be used to process and execute instructions 110. The data stream 114 can also include source data fetched according to source operands of the instructions 110 for processing the instructions 110. As will be discussed in more detail below, the pattern record circuit 106 is configured to receive information in the data stream 114 in order to detect the frequency of incoming data 112. The pattern fetch circuit 108 in the processor 102 is configured to receive an indication of the next incoming data 112 from the data stream 114 in the instruction pipeline $I_0$-$I_N$. Additionally, the pattern fetch circuit 108 is configured to determine if the next incoming data 112 from the data stream 114 matches previously occurring data in the data stream 114 recorded in the pattern record circuit 106, through the use of a next incoming data indication 154. The next incoming data indication 154 is configured to reference the data record circuit 142 to determine if the next incoming data 112 matches a matching data indicator entry 147(1)-147(K) of a data record entry 144(1)-144(K) among the plurality of data record entries in the data record circuit 142. If the next incoming data indication 154 does match a data indicator entry 147(1)-147(K), a matching data pattern 158 is fetched from the data record circuit 142 to be injected into the instruction pipeline $I_0$-$I_N$. Before discussing the exemplary details of the pattern record circuit 106 and the pattern fetch circuit 108, other exemplary components of the processor 102 are first discussed below with reference to FIG. 1.

With continuing reference to FIG. 1, the processor 102 includes an instruction processing circuit 104 that includes the one or more instruction pipelines $I_0$-$I_N$ for processing computer instructions for execution. The processor 102 is an out-of-order processor (OoP) shown in FIG. 1, but could also be an in-order processor. The instruction processing circuit 104 includes an instruction fetch circuit 116 that is configured to fetch instructions 110 from an instruction memory 118 as data into the data stream 114. The instruction memory 118 may be provided in or as part of a system memory in the processor-based system 100 as an example. An instruction cache 120 may also be provided in the processor 102 to cache the instructions 110 fetched from the instruction memory 118 to reduce timing delay in the instruction fetch circuit 116. The instruction fetch circuit 116 in this example is configured to provide the instructions 110 as fetched instructions 110F into the one or more instruction pipelines $I_0$-$I_N$ as an instruction stream 114I in the instruction processing circuit 104 as the data stream 114 to be pre-processed, before the fetched instructions 110F reach an execution circuit 122 to be executed as executed instructions 110E. The instruction pipelines $I_0$-$I_N$ are provided across different processing circuits or stages of the instruction processing circuit 104 to pre-process and process the fetched instructions 110F in a series of steps that can be performed concurrently to increase throughput prior to execution of the fetched instructions 110F by the execution circuit 122.

A control flow prediction circuit 124 (e.g., a control flow prediction circuit) is also provided in the instruction processing circuit 104 in the processor 102 of FIG. 1 to speculate or predict the outcome of a predicate of a fetched conditional control instruction 110F, such as a conditional branch instruction, that affects the instruction control flow path of the instruction stream 114I processed in the instruction pipelines $I_0$-$I_N$. The prediction of the control flow prediction circuit 124 can be used by the instruction fetch circuit 116 to determine the next fetched instructions 110F to fetch based on a predicted branch target address. The instruction processing circuit 104 also includes an instruction decode circuit 126 configured to decode the fetched instructions 110F fetched by the instruction fetch circuit 116 into decoded instructions 110D to determine the instruction type and actions required. The instruction type and action required, which is encoded in the decoded instruction 110D, may also be used to determine in which instruction pipeline $I_0$-$I_N$ the decoded instructions 110D should be placed. Accordingly, the decoded instructions 110D are written to a destination register operand associated with available physical registers $P_0$, $P_1$, . . . , $P_X$ in a physical register file (PRF) 128. Each physical register $P_0$-$P_X$ in the PRF 128 is configured to store a data entry 130(0)-130(X) for the source and/or destination register operand of a decoded instruction 110D. The decoded instructions 110D can retrieve source data stored in the PRF 128 as part of a source data stream 114S for processing and execution in the instruction fetch circuit 116 according to its named source operand. In this example, the decoded instructions 110D are placed in one or more of the instruction pipelines $I_0$-$I_N$ and are next provided to an issue circuit 132 in the instruction processing circuit 104.

The issue circuit 132 is further configured to store decoded instructions 110D in reservation entries in the instruction pipeline $I_0$-$I_N$ until all their respective source register operands are available for consumption in execution. The issue circuit 132 issues decoded instructions 110D ready to be executed by the execution circuit 122. A commit circuit 134 is also provided in the instruction processing circuit 104 to commit or write-back produced values generated by execution of decoded instructions 110D to memory, such as the PRF 128, cache memory, or system memory.

Repetitive patterns can occur in the data stream 114 in the instruction pipelines $I_0$-$I_N$ of the instruction processing circuit 104 in FIG. 1 as a result of fetching and processing instructions 110 to be executed. For example, the fetched instructions 110F to be executed may be in a programming construct, such as a software loop. Software loops may be re-executed a number of times by the instruction processing circuit 104 before the loop is exited, thus causing instructions 110 in the loop to be repetitively fetched by the instruction fetch circuit 116 and processed for execution in the execution circuit 122. Not only may the same instructions 110 be repeatedly fetched and processed in an instruction pipeline $I_0$-$I_N$, but the source data consumed for processing these instructions 110 may also result in repetition of data in the instruction pipeline $I_0$-$I_N$. Each repetitive fetching of instructions 110 into an instruction pipeline $I_0$-$I_N$ of the instruction processing circuit 104 to be processed and executed consumes power in the instruction fetch circuit 116.

In this regard, to recognize repetition of data in the data stream 114 (e.g., the instruction stream 114I and/or the source data stream 114S) in the instruction pipeline $I_0$-$I_N$ of the processor 102, to potentially avoid re-fetching of repetitive data, the pattern record circuit 106 is provided in the processor 102 in FIG. 1. The pattern record circuit 106 is configured to receive information in the data stream 114 (e.g., instruction stream 114I and/or source data stream 114S) in the instruction pipeline $I_0$-$I_N$. The pattern record circuit 106 includes a first input record column $S_0$ that includes an input data entry 136(0) and one or more additional record columns $S_1$-$S_K$ that each include respective additional data entries 136(1)-136(K) configured to receive and store incoming data 112 from the data stream 114. The number of record columns 0-K in the pattern record circuit 106 defines the width of the pattern record circuit 106. As new incoming data 112 occurs in the data stream 114, the pattern record circuit 106 is configured to sequentially record the next incoming data 112 from the data stream 114 into the input data entry 136(0) of the input record column $S_0$ in the pattern record circuit 106. As each additional new incoming data 112 occurs in the data stream 114, the pattern record circuit 106 is configured to shift the previously recorded data received from the data stream 114 in the input data entry 136(0) and additional data entries 136(1)-136(K−1) of the respective input and additional record columns $S_0$-$S_{K-1}$ to adjacent entries of adjacent record columns $S_1$-$S_K$ of the pattern record circuit 106. The previously recorded data from the data stream 114 in the last additional record column entry $S_K$ is shifted out of the pattern record circuit 106. Thus, if data repeats in the data stream 114, the incoming data 112 recorded in the input record column $S_0$ in the pattern record circuit 106 will match a previous occurrence of the data that is shifted into an additional record column $S_1$-$S_K$. Furthermore, each of the additional data entries 136(1)-136(K−1) includes frequency indicators 138(1)-138(K) that include frequency counters 140(1)-140(K). Each of the frequency indicators 138(1)-138(K) is configured to determine if there is repetition in the additional data entries 136(1)-136(K−1) that corresponds with the next incoming data 112 inputted in the input record column $S_0$. This is shown in more detail by example in FIGS. 2A and 2B discussed below, where the pattern record circuit 106 includes a first in, first out (FIFO) table circuit as an example.

Figure 2A:
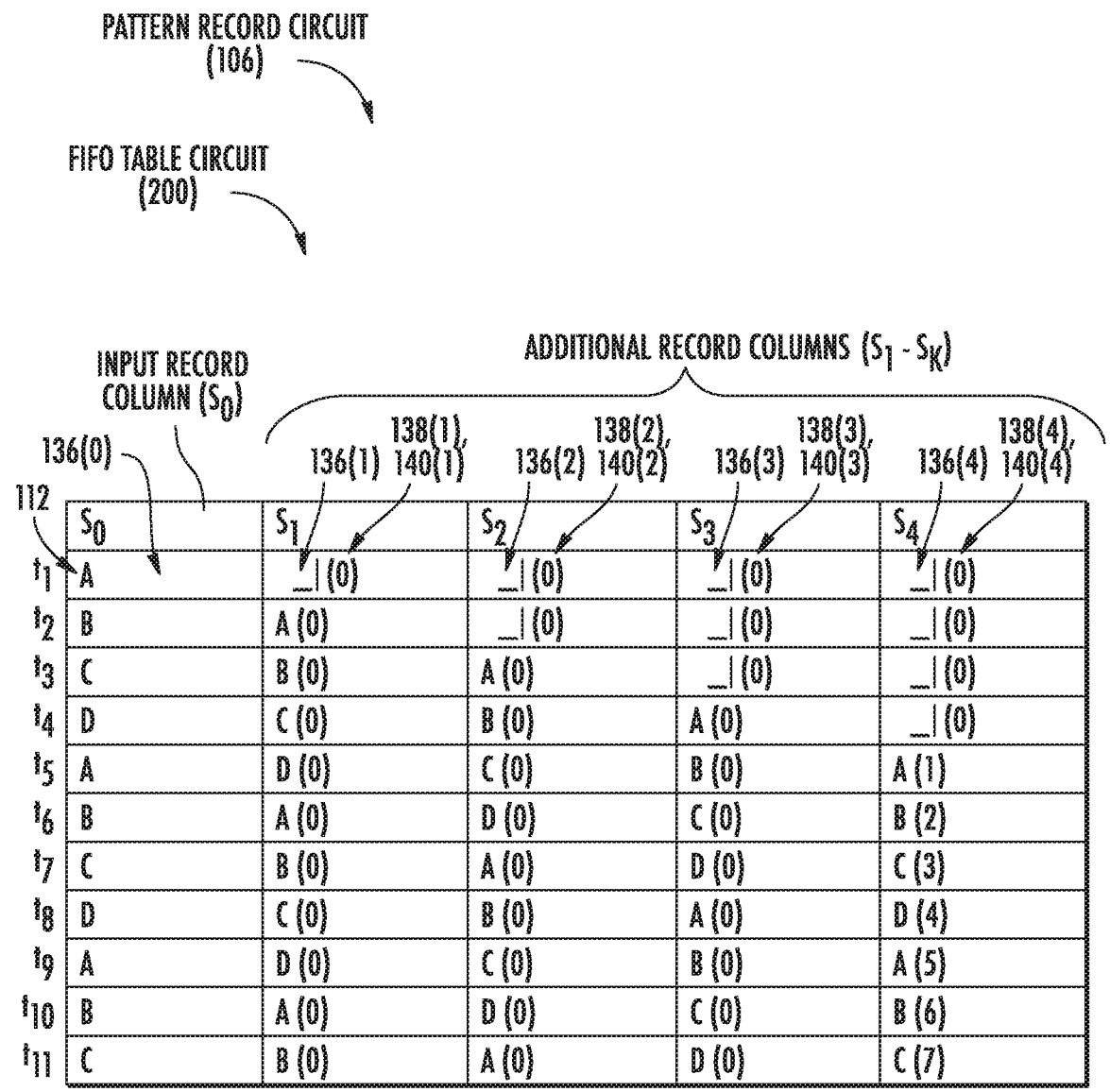
FIG. 2A is a diagram of the pattern record circuit in FIG. 1 being updated sequentially in time as new data is fetched in the instruction pipeline as a data stream and the frequency indicators are updated to indicate the number of times the data is repeated in the instruction pipeline.

FIG. 2A is a diagram of an exemplary history of incoming data 112 from the data stream 114 in the processor 102 in FIG. 1 being recorded in the pattern record circuit 106 over time to register reoccurring data in the data stream 114. As discussed above, the pattern record circuit 106 is configured to record a history of the incoming data 112 from the data stream 114. In this example, the pattern record circuit 106 is provided in the form of an exemplary FIFO table circuit 200 that is configured to record the incoming data 112 fetched into the instruction pipeline $I_0$-$I_N$ of the instruction processing circuit 104. Accordingly, the FIFO table circuit 200 includes a plurality of data record columns $S_0$-$S_4$ each comprising a single data entry 136(0)-136(4). The data record column $S_0$ is the input data record column $S_0$, and the data record columns $S_1$-$S_4$ are the additional record columns. Thus, the column width of the FIFO table circuit 200 in FIG. 2A is five (5) (i.e., $S_0$-$S_4$), wherein input data entry 136(0) is configured to record the next incoming data 112, and the previously recorded incoming data 112 is recorded in the additional data entries 136(1)-136(4) of the respective additional record columns $S_1$-$S_4$. Each row labeled time $t_1$-$t_{11}$ of the FIFO table circuit 200 represents one iteration of received incoming data 112.

With continuing reference to FIG. 2A, in this example, at time $t_1$, the FIFO table circuit 200 receives new incoming data 112 fetched in the instruction pipeline $I_0$-$I_N$ in the data stream 114 as incoming data 'A' at time $t_1$. Thus, incoming data 'A' is recorded in the input data entry 136(0) in the input record column $S_0$. Next, assume the following next incoming data 112 after incoming data 'A' that occurs in the data stream 114 is data 'B'. In this regard, as shown as time $t_2$, incoming data 'B' is written into the input data entry 136(0) in the input record column $S_0$. Before writing the incoming data 'B' in the input data entry 136(0) in the input record column $S_0$, the FIFO table circuit 200 shifts previously recorded incoming data 'A' from the input data entry 136(0) in the input record column $S_0$ by one (1) column to the additional data entry 136(1) in the additional record column $S_1$. This continues to occur for the next incoming data 'C' at time $t_3$, and so on. At time $t_5$, the first incoming data 'A' at time $t_1$ has been shifted all the way to the last additional record column $S_4$ as shown in FIG. 2A such that the data 'A' 'B' 'C' 'D' 'A' has been received as incoming data 112 from the data stream 114. As also shown in the FIFO table circuit 200 in FIG. 2A, at time $t_{11}$, the incoming data 112 received since time $t_1$ is 'A' 'B' 'C' 'D' 'A' 'B' 'C' 'D' 'A' 'B' 'C'. Thus, it can be seen in this example that the data pattern 'A' 'B' 'C' 'D' is fully repeated twice in the data stream 114 and is starting to repeat again with data pattern 'A' 'B' 'C' at times $t_9$, $t_{10}$, and $t_{11}$.

To track the occurrence of data repetition in the incoming data 112 as a pattern in the data stream 114, the FIFO table circuit 200 also includes respective frequency indicators 138(1)-138(4) in each additional record column $S_1$-$S_K$ in the form of a frequency counter 140(1)-140(4) in this example. The additional record columns $S_1$-$S_K$ of the FIFO table circuit 200 are configured to compare the incoming data 112 from the data stream 114 recorded in the input data entry 136(0) in the input record column $S_0$ to each of the previously recorded and shifted incoming data 112 recorded in the additional data entries 136(1)-136(4) in the respective additional data columns $S_1$-$S_K$. The frequency indicators 138(1)-138(4) start out as NULL values until incoming data 112 is shifted into the additional data entry 136(1)-136(4) of its respective additional record column $S_1$-$S_4$. In response to the data in an additional data entry 136(1)-136(4) of a respective additional data column $S_1$-$S_K$ matching the incoming data 112 recorded in the input data entry 136(0) of the input record column $S_0$, the FIFO table circuit 200 is configured to update (e.g., increment) the respective frequency indicators 138(1)-138(4) in the respective additional data columns $S_1$-$S_4$ to indicate a repetition and the repetition frequency of the incoming data 112 in the data stream 114. If the additional data entry 136(1)-136(4) of a respective additional data column $S_1$-$S_K$ does not match the incoming data 112 recorded in the input data entry 136(0) of the input record column $S_0$, the respective frequency indicators 138(1)-138(4) in the respective additional data column $S_1$-$S_4$ are reset to zero (0).

Thus, for example as shown in FIG. 2A, at times $t_1$-$t_4$, the frequency indicators 138(1)-138(4) in the respective additional data columns $S_1$-$S_K$ are of value '0' since there has not yet been a determined repetition of the incoming data 112 from the data stream 114. However, at time $t_5$, the FIFO table circuit 200 records the value of '1' in the frequency indicator 138(4) in additional record column $S_4$ to signify that the data 'A' stored in associated additional data entry 136(4) has been detected as repeating in the incoming data 112 recorded in input data entry 136(0). As time progresses after time $t_5$, for this example data pattern 'A' 'B' 'C' 'D' 'A' 'B' 'C' 'D' 'A' 'B' 'C', the frequency counters 140(1)-140(4) are incremented for detection of a reoccurrence of incoming data 112. Thus, for example, at time $t_8$, frequency counter 140(4) is of value '4', because the shifted-in incoming data 112 in additional data entry 136(4) has been detected to match the incoming data 112 recorded in the input data entry 136(0) four (4) times at this point. The additional data entry 136(4) is incremented such that the distance between matching (i.e., reoccurrence of) incoming data 112 in the data stream 114 is four (4) data elements. In other words, the distance between the input record column $S_0$ and an additional record column $S_1$-$S_4$ whose data in its data entries 136(0) and 136(1)-136(4) match equals the distance in the data stream 114 between a reoccurrence (i.e., repeat) of data in the data stream 114. If the additional data entry 136(2) had been incremented, this would mean there was a detected reoccurrence of incoming data 112 in the data stream 114 within a distance of two (2) data elements.

In this example, the data pattern 'A' 'B' 'C' 'D' has repeated once so far with a repetition frequency of every four (4) elements of incoming data 112, so the frequency counter 140(4) is equal to '4'. Thus, at time $t_{11}$, frequency counter 140(4) is of value '7', because the shifted-in incoming data 112 in additional data entry 136(4) has been detected to match the incoming data 112 recorded in the input data entry 136(0) seven (7) times. The data pattern of distance '4' in this example can be determined, because the frequency counter 140(4) in the fourth additional record column $S_4$ minus the number of the additional record column $S_4$ is greater than four (4). The value of the frequency counter 140(1)-140(4) minus the column number of its associated additional record column $S_1$-$S_4$, divided by the column number of its associated additional record column $S_1$-$S_{4+1}$, rounded down to the positive whole integer, and incremented by one, is the number of times the data pattern of a width equal to the number of the associated additional record column $S_1$-$S_4$ has repeated. Thus, in this example, at time $t_8$, the frequency counter 140(4) of value '4' means that the data pattern 'A"B"C"D' has repeated once so far, because '4'-'4' (i.e., value of frequency counter 140(4) in additional record column $S_4$ at time $t_8$ minus the column number of the associated additional record column $S_4$ of '4') is equal to '0'. Zero '0' is then divided by the column number of the associated additional record column $S_4$ of '4' to arrive at '0', which is then rounded down to the next positive whole integer of '0'. Then, '0' added with '1' equals '1' or one time of the data pattern 'A' 'B' 'C' 'D' repeated. Thus, in this example, at time $t_{11}$, the frequency counter 140(4) of value '7' means that the data pattern 'A' 'B' 'C' 'D' has repeated once so far, because '7'-'4' (i.e., value of frequency counter 140(4) in additional record column $S_4$ at time $t_{11}$ minus the column number of the associated additional record column $S_4$ of '4'), is equal to three (3). Three (3) is then divided by the column number of the associated additional record column $S_4$ of '4' to arrive at 0.75, which is then rounded down to the next positive whole integer of '0'. Then, '0' added with '1' equals '1', representing a repeat of the data pattern 'A' 'B' 'C' 'D' being completed only one time thus far. If after time $t_{11}$, the next incoming data 112 is 'D,' the frequency counter 140(4) would be incremented to a value of '8'. This value of '8' is subtracted by the column number of the associated additional record column $S_4$ of '4', which equals to '4', and is then divided by the column number of the associated additional record column $S_4$ of '4', and rounded down to the next positive whole integer, which would be equal to '1'+'1'='2', signifying that the data pattern 'A' 'B' 'C' 'D' has repeated twice.

Figure 2B:
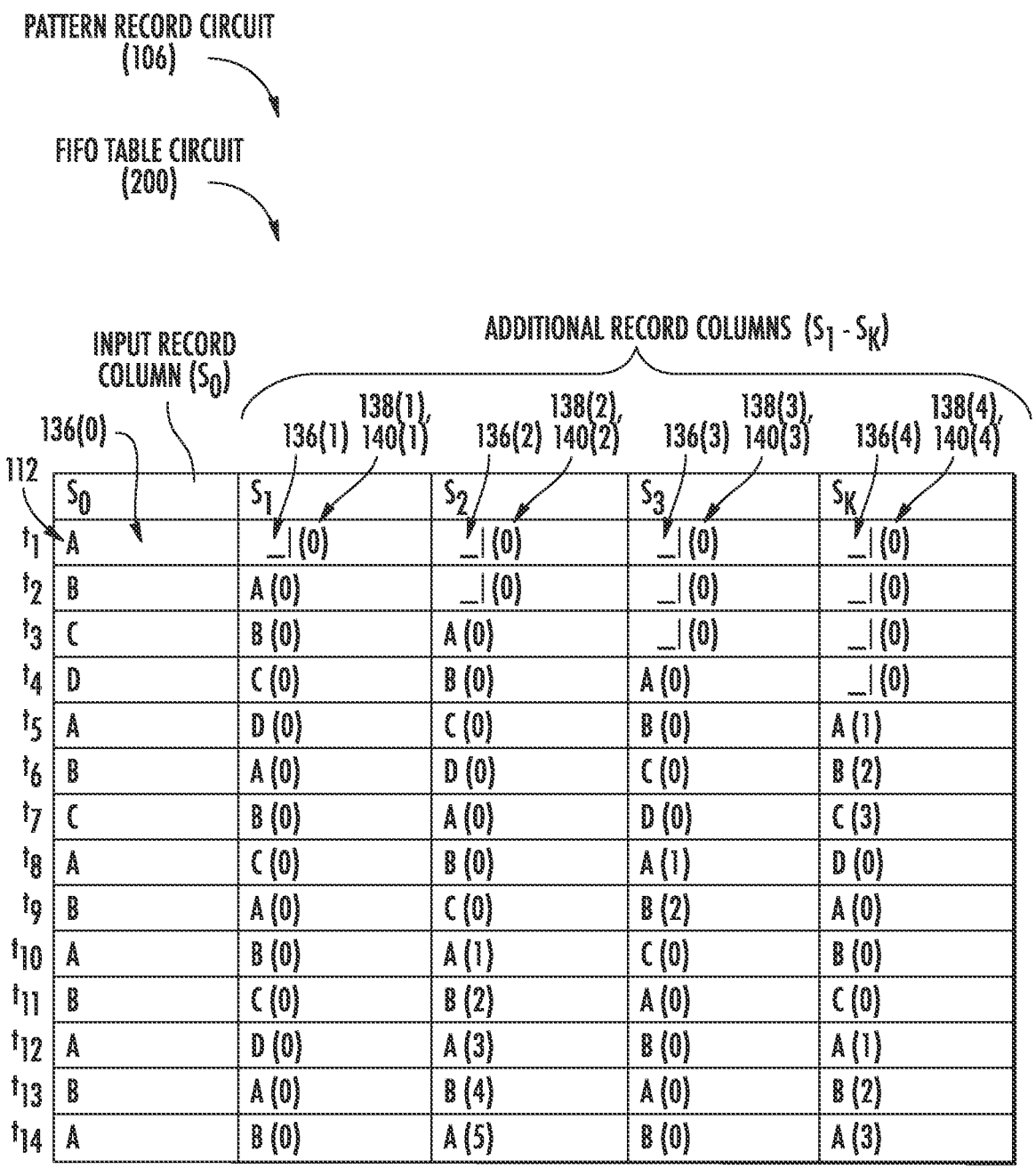
FIG. 2B is a diagram of the pattern record circuit in FIG. 1, providing an additional example of the pattern record circuit being updated as new data is fetched in the instruction pipeline and the frequency indicators are updated to indicate the number of times the data is repeated in the instruction pipeline.

FIG. 2B is a diagram of another exemplary history of incoming data 112 from the data stream 114 in the processor 102 of FIG. 1 being recorded in the FIFO table circuit 200 of the pattern record circuit 106 over time to register reoccurring data in the data stream 114. The data pattern of incoming data 112 recorded in the FIFO table circuit 200 in this example is 'A' 'B' 'C' 'D' 'A' 'B' 'C' 'A' 'B' 'A' 'B' 'A' 'B' 'A'. Thus, the data pattern of incoming data 112 appears once as 'A' 'B' 'C' 'D', is almost repeated by a subsequent sequence of 'A' 'B' 'C', and three (3) times as 'A' 'B' in this example. The intermediate data pattern 'A' 'B' 'C' occurs, but is not repeated. Thus, in this example, from times $t_1$-$t_7$, the FIFO table circuit 200 receives the same incoming data 112 as received in the example of the FIFO table circuit 200 in FIG. 2A. However, unlike the example in FIG. 2A, at time $t_8$, the next incoming data 112 received by the FIFO table circuit 200 in FIG. 2B is 'A' rather than 'D'. Thus, the frequency counter 140(4) at time $t_8$ does not increment to a value of '4', but rather is reset to zero (0) to indicate that a potential data pattern repetition has been broken (i.e., has not occurred). As discussed above, for a data pattern to be detected in the fourth additional record column $S_4$, the frequency counter 140(4) must be a value of '4' or greater.

However, at time $t_8$, the incoming data 112 of 'A' in input data entry 136(0) matches the previously recorded incoming data of 'A' in additional data entry 136(3) in additional record column $S_3$ such that the frequency counter 140(3) is incremented to a value of '1'. However, a three element repetitive data pattern has not been established unless the frequency counter 140(3) reaches a value of '3' as discussed above. The frequency counter 140(3) does not reach a value of '3' in the example in FIG. 2B, because element 'C' recorded at time $t_7$ does not reoccur at time $t_8$ and thus its frequency counter 140(3) is reset to zero (0) at time $t_{10}$. However, as shown at times $t_8$-$t_{15}$, the incoming data 112 has a data pattern of 'A' 'B' that repeats three (3) times. Thus, as shown in FIG. 2B, the FIFO table circuit 200 is able to capture a potential data pattern incoming data 112 of 'A' 'B' 'C' 'D' and a changing data pattern of the incoming data 112 of 'A' 'B' through the frequency counter 140(1)-140(4). Thus, because the incoming data 112 of data pattern 'A' 'B' occurs three (3) times in a row, the frequency counter 140(2) is eventually incremented to a value of '5'.

In the exemplary FIFO table circuit 200 in FIG. 2B, at time $t_{13}$, the frequency counter 140(2) having a value of '4' means that the data pattern 'A' 'B' having a width of two '2', is equal to the column number for frequency counter 140(2). Accordingly, as shown at time $t_{13}$, the pattern 'A' 'B' has repeated twice thus far. This is because '4'-'2' (i.e., value of frequency counter 140(2) in additional record column $S_2$ at time $t_{13}$ minus the column number of the associated additional record column $S_2$ of '2') is equal to '2'. Then, this value of '2' is divided by the column number of the associated additional record column $S_2$ of '2', which is equal to '1', and then rounded down to the next positive whole integer which is still equal to '1'. Then, '1' added with '1' equals '2' or two times of the data pattern 'A' 'B' repeated. Thus, in this example, at time $t_{14}$, the frequency counter 140(2) of value '5' means that the data pattern 'A' 'B' has still repeated only twice so far, because '5'-'2' (i.e., value of frequency counter 140(2) in additional record column $S_2$ at time $t_{14}$ minus the column number of the associated additional record column $S_2$), and then divided by the column number of the associated additional record column $S_2$ of '2' is equal to '1.5'. This value of '1.5' is then rounded down to the next positive whole integer which is equal to '1'. Then, '1' added with '1' equals '2', meaning that data pattern 'A' 'B' has repeated twice.

Next, assume the next incoming data 112 after incoming data 'A' that occurs in the data stream 114 is data 'B'. In this regard, as shown as time $t_2$, incoming data 'B' is written into the input data entry 136(0) in the input record column $S_0$. Before writing the incoming data 'B' in the input data entry 136(0) in the input record column $S_0$, the FIFO table circuit 200 shifts previously recorded incoming data 'A' from the input data entry 136(0) in the input record column $S_0$ by one (1) column to the additional data entry 136(1) in the additional record column $S_1$. This continues to occur for the next incoming data 'C' at time $t_3$, and so on. At time $t_5$, the first incoming data 'A' at time $t_1$ has been shifted all the way to the last additional record column $S_K$ as shown in FIG. 2B such that the data 'A' 'B' 'C' 'D' 'A' has been received as incoming data 112 from the data stream 114. As also shown in the FIFO table circuit 200 in FIG. 2B, at time $t_{11}$, the incoming data 112 received since time $t_1$ is 'A' 'B' 'C' 'D' 'A' 'B' 'C' 'A' 'B' 'A' 'B'. Thus, it can be seen in this example that the data pattern 'A' 'B' 'C' 'D' has repeated fully twice in the data stream 114 and is starting to repeat again with data pattern 'A' 'B' 'C' at times $t_9$, $t_{10}$, and $t_{11}$. If after time $t_{14}$, the next incoming data 112 were 'B,' the frequency counter 140(2) would be incremented to a value of '6'. This value of '6' subtracted by the column number of the associated additional record column $S_2$ of '2', which is equal to '4', and which is then divided by the column number of the associated additional record column $S_2$ of '2' and rounded down to the next positive whole integer would be equal to '2'+'1'='3', meaning that data pattern 'A' 'B' has repeated three times.

Now that the pattern record circuit 106 and its example in the form of a FIFO table circuit 200 has been described by example in FIGS. 2A and 2B, a data record circuit 142 in the processor 102 of FIG. 1 is now described. As discussed below, a data record circuit 142 is configured to analyze the frequency indicators 138(0)-138(K) in the pattern record circuit 106 in FIG. 1 to recognize and record data patterns in the data stream 114 and record the number of repetitions of such data patterns. The data record circuit 142 is also configured to record the start of a recognized repeated data pattern in the data stream 114, so that when this start in the data stream 114 is again later recognized, the previously recorded data pattern according to the number of repetitions determined can be injected into the instruction pipeline $I_0$-$I_N$ to avoid the need to re-fetch the repeated data according to its determined data pattern. As will also be discussed below, the pattern fetch circuit 108 is configured to analyze the incoming data 112 in the data stream 114 in an instruction pipeline $I_0$-$I_N$ and consult the data record circuit 142 to determine the start of a previously recorded data pattern in the data stream 114. The pattern fetch circuit 108 is then configured to inject a previously recorded data pattern according to the number of previously occurring repetitions in the data stream 114 to avoid having to re-fetch the data repeated in the previously recorded data pattern. The data record circuit 142 in FIG. 1 will now be discussed in more exemplary detail followed by the pattern fetch circuit 108.

With reference to FIG. 1, the data record circuit 142 includes a plurality of data record entries 144(1)-144(K) equal to the number 'K' of additional record columns $S_1$-$S_K$ in the pattern record circuit 106 in this example. Each of the data record entries 144(1)-144(K) in the data record circuit 142 corresponds to a respective additional record column $S_1$-$S_K$ in the pattern record circuit 106. Each data record entry 144(1)-144(K) in the data record circuit 142 is configured to store the incoming data 112 that comes into the pattern record circuit 106 as a recorded data stream 146. Accordingly, the incoming data 112 is not stored as a recorded data stream 146 into the data record circuit 142, until the frequency counter 140(1)-140(4) increments to a value of 1. This value of 1 indicates that a pattern has been recognized, and thus is required to be stored in the data record circuit 142 for future re-fetching.

The data record circuit 142 is configured to store a matching data indicator entry 147(1)-147(K), a repetition indicator entry 148(1)-148(K), and a data pattern entry 150(1)-150(K), based on the recorded data stream 146. The matching data indicator entry 147(1)-147(K) is a program counter (PC) that is assigned to each data record entry 144(1)-144(K). The PC is configured to allow the pattern fetch circuit 108 to identify an instruction in the program code to be potentially re-fetched from the data record circuit 142. The repetition indicator entry 148(1)-148(K) is configured to determine a number of repetitions of the pattern stored in the data record entry 144(1)-144(K), from the frequency counter 140(1)-140(4) in the additional record columns $S_1$-$S_K$. As the frequency counter 140(1)-140(4) increments, the data record circuit 142 is subsequently updated in order to indicate the number of times the pattern has repeated. The data pattern entry 150(1)-150(K) is configured to receive the recorded data stream 146 that has been determined by the frequency counter 140(1)-140(4) to have one or more repetitions resulting in a data pattern. Accordingly, the data record entries 144(1)-144(K) in the data record circuit 142 are configured to identify data in the recorded data stream 146 via the PC in the matching data indicator entry 147(1)-147(K), identify the pattern associated with the PC in the data pattern entry 150(1)-150(K), and the number of times the pattern in the data pattern entry 150(1)-150(K) should be repeated based on the value stored in the repetition indicator entry 148(1)-148(K). The data record circuit 142 is further configured to fetch a plurality of instructions 110 from a program counter of the matching data indicator entry 147(1)-147(K) into the instruction pipeline $I_0$-$I_N$ as the data stream 114. The program counter of the matching data indicator entry 147(1)-147(K) is configured to be consulted by the pattern fetch circuit 108 to check for a previously stored pattern that is available to inject into the instruction pipeline $I_0$-$I_N$ in order to avoid fetching new instructions 110. Accordingly, as the data in the additional record columns $S_1$-$S_K$ in the pattern record circuit 106 are updated, the data record entries 144(1)-144(K) in the data record circuit 142 are configured to reflect the incrementing of the frequency counters 140(1)-140(4) and the associated pattern of data from the data stream 114. Accordingly, there can be instances where the frequency counters 140(1)-140(4) have reset due to a halt in repetition and the frequency indicator 138(1)-138(4) being reset to a no repetition frequency state. The no repetition frequency state is configured to indicate that there is no occurrence of a repetition frequency of the incoming data 112 in the data stream 114, associated with the frequency counters 140(1)-140(4) in the additional record columns $S_1$-$S_K$. The repetition indicator entry 148(1)-148(K), the data pattern entry 150(1)-150(K), and the matching data indicator entry 147(1)-147(K) in the data record circuit 142, are configured to reset for the data record entries 144(1)-144(4) corresponding to the additional record columns $S_1$-$S_K$.

The data record entries 144(1)-144(4) are configured to be referenced by the pattern fetch circuit 108 in the processor 102 as shown in FIG. 1. The pattern fetch circuit 108 is configured to fetch the data record entry 144(1)-144(4) matching a program counter of data fetched by the instruction fetch circuit 116. Accordingly, the pattern fetch circuit 108 is configured to receive a data indication 152 of new data fetched into the instruction pipeline $I_0$-$I_N$. The data indication 152 received by the pattern fetch circuit 108 is configured to be processed in order to obtain a program counter that is used to determine if a matching program counter exists in the matching data indicator entry 147(1)-147(K) in the data record circuit 142. If the matching program counter is located, the pattern fetch circuit 108 is able to access the pattern in the data pattern entry 150(1)-150(K), and the pattern's number of repetitions in the repetition indicator entry 148(1)-148(K). The repetition indicator in the repetition indicator entry 148(1)-148(K) is checked to see if a data pattern repetition threshold is exceeded. If the data pattern repetition threshold is exceeded, the recorded data in the data pattern entry 150(1)-150(K) of the data record circuit 142 containing the matching program counter in the matching data indicator entry 147(1)-147(K) is fetched. The recorded data stream 146 fetched from the data record circuit 142 is then injected into the instruction pipeline $I_0$-$I_N$ for a number of repetitions as provided by the repetition indicator in the repetition indicator entry 148(1)-148(K). During the injection of the recorded data stream 146, the pattern fetch circuit 108 is configured to halt the processor 102 from fetching new incoming data 112 into the instruction pipeline $I_0$-$I_N$ for the duration of the number of repetitions stored in the matching data indicator entry 147(1)-147(K) associated with the recorded data stream 146.

Figure 3:
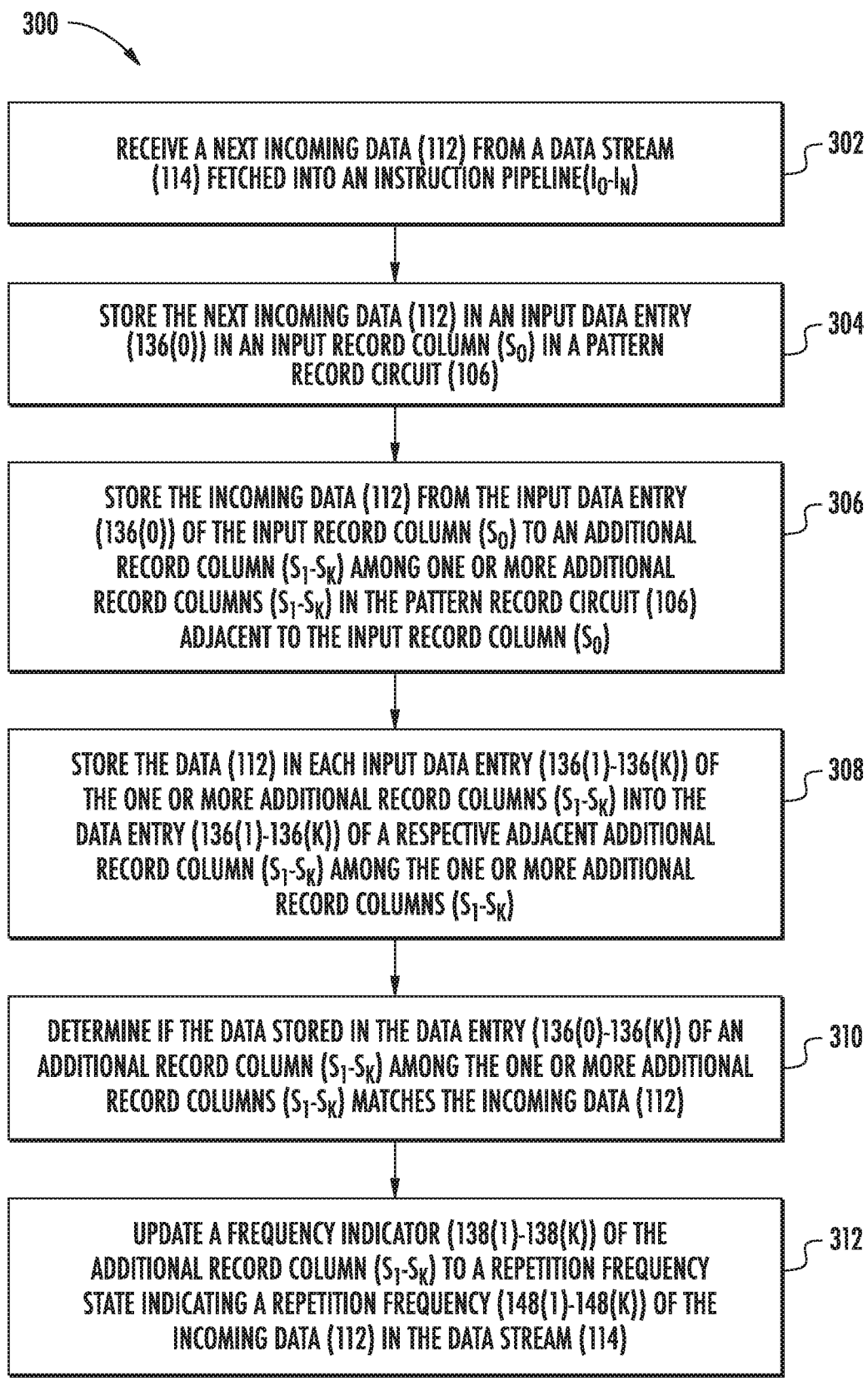
FIG. 3 is a flowchart illustrating an exemplary process of the pattern record circuit in the processor of FIG. 1 sequentially recording new data that is fetched in the instruction pipeline as a data stream and the updating of frequency indicators indicating the number of times the data is repeated in the instruction pipeline.

FIG. 3 is a flowchart illustrating an exemplary process of the pattern record circuit 106 in the processor 102 of FIG. 1, sequentially recording new data that is fetched in the instruction pipeline $I_0$-$I_N$ as a data stream 114. Furthermore, the pattern record circuit 106 is configured to actively update frequency indicators 138(1)-138(K) in FIG. 1 indicating the number of times the data is repeated in the instruction pipeline $I_0$-$I_N$. The process of the pattern record circuit 106 is discussed below in conjunction with the processor 102 of an instruction processing circuit 104 in FIG. 1.

In this regard, the pattern record circuit 106 is configured to receive a next incoming data 112 from the data stream 114 that is fetched into the instruction pipeline $I_0$-$I_N$ (block 302 in FIG. 3). As discussed above, the next incoming data 112 received is input into the FIFO table circuit 200, sequentially as the data 112 from the data stream 114 is fetched by the instruction fetch circuit 116. With each next incoming data 112 that is input sequentially into the FIFO table circuit 200, the pattern record circuit 106 stores the next incoming data 112 into an input data entry 136(0) in the input record column $S_0$ (block 304 in FIG. 3). As new next incoming data 112 is received in the FIFO table circuit 200, the incoming data 112 is first placed into the input data entry 136(0) in the input record column $S_0$, and the data 112 in the input data entry 136(0) is then stored in an additional record column $S_1$-$S_K$ among one or more additional record columns $S_1$-$S_K$ in the pattern record circuit 106 adjacent to the input record column $S_0$ (block 306 in FIG. 3). In some instances, the one or more additional record columns $S_1$-$S_K$ in the plurality of additional record columns $S_1$-$S_K$ may have data previously stored in the associated data entry 136(1)-136(K). As such, the process of the pattern record circuit 106 also includes storing the data 112 in each input data entry 136(1)-136(K) of the one or more additional record columns $S_1$-$S_K$ into the data entry 136(1)-136(K) of a respective adjacent additional record column $S_1$-$S_K$ among the one or more additional record columns (block 308 in FIG. 3). Accordingly, as the incoming data 112 in the data stream 114 is sequentially being input into the FIFO table circuit 200 of the pattern record circuit 106, the frequency indicators 138(1)-138(K) in the data entries 136(1)-136(K) in the additional record columns $S_1$-$S_K$ determine if there is a repetition of the data 112 currently stored in the input data entry 136(1)-136(K). In order to determine if there is a repeat of data 112 that has been received from the instruction pipeline $I_0$-$I_N$, the process of the pattern record circuit 106 includes determining if the data stored in the data entry 136(1)-136(K), of an additional record column $S_1$-$S_K$ among the one or more additional record columns $S_1$-$S_K$ matches the incoming data 112 (block 310 in FIG. 3). If there is a match, the frequency counter 140(1)-140(K) in the frequency indicators 138(1)-138(K) is updated in order to reflect a repetition frequency state if the data in the input data entry 136(1)-136(K) matches the incoming data 112 in the input record column $S_0$, indicating a repetition frequency of the incoming data 112 in the data stream 114 (block 312 in FIG. 3). Additionally, if a match is not detected, the frequency counter 140(1)-140(K) in the frequency indicator 138(1)-138(K) is updated in order to reflect a no repetition frequency state. Thus, the frequency counter 140(1)-140(K) is reset.

Figure 4:
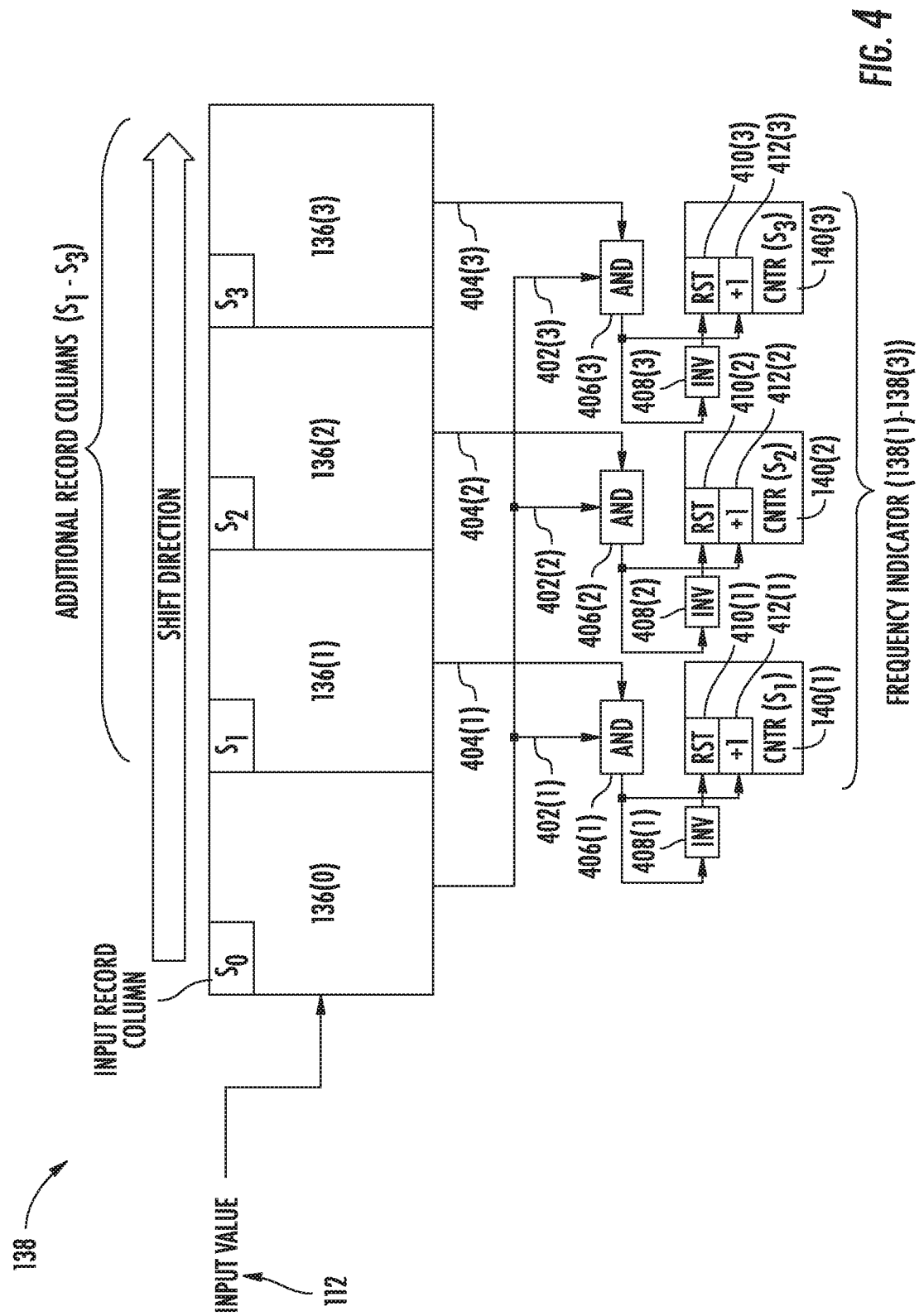
FIG. 4 is a diagram of an exemplary pattern record circuit that can be provided in the processor of FIG. 1 to record incoming data fetched into the instruction pipeline and to update frequency indicators indicating the number of times the data is repeated in the instruction pipeline.

FIG. 4 is a diagram of an exemplary pattern record circuit 106 that can be provided in the processor 102 of FIG. 1 to record incoming data 112 fetched into the instruction pipeline $I_0$-$I_N$ and to update frequency indicators 138(1)-138(K) indicating the number of times the data 112 is repeated in the instruction pipeline $I_0$-$I_N$. As discussed above, in order to determine if there is a repeat of incoming data 112 that has been received and placed into an instruction pipeline $I_0$-$I_N$, the process of the pattern record circuit 106 includes determining if the data stored in the data record entry 144(1)-144(K) of an additional record column $S_1$-$S_K$ among the one or more additional record columns $S_1$-$S_K$ matches the incoming data 112. In order to determine if there is a match, the frequency indicators 138(1)-138(K) of each of the additional record columns $S_1$-$S_K$ are incremented in this example in response to a first input 402(1)-402(3) and a second input 404(1)-404(3) of an AND-based logic gate 406(1)-406(3) of each of the frequency indicators 138(1)-138(3) generating a true output, which in this example would be a logic '1' or logic high output. Accordingly, the AND-based logic gate 406(1)-406(3) receives the incoming data 112 stored in the input data entry 136(0) of the input record column $S_0$ as the first input 402(1)-402(3), and the incoming data 112 stored in the data entries 136(1)-136(K) of the additional record columns $S_1$-$S_K$ as the second input 404(1)-404(3). In one example, the output of each AND-based logic gate 406(1)-406(3) is coupled to a respective inverter circuit 408(1)-408(3) and subsequently a reset circuit 410(1)-410(3). If each of the respective first input 402(1)-402(3) and the second input 404(1)-404(3) are not resolved by the respective AND-based logic gate 406(1)-406(3) to have matching data entries 136(1)-136(3) with the input data entry 136(0) in both the input record column $S_0$ and the additional record columns $S_1$-$S_K$, a false or logic low output (e.g., a logic '0' value) is received by the inverter circuit 408(1)-408(3). The inverter circuit 408(1)-408(3) inverts the low output of '0' into an output of '1' in order to activate the reset circuit 410(1)-410(3). Accordingly, activating the reset circuit 410(1)-410(3) results in the frequency indicator 138(1)-138(3) resetting the frequency counter 140(1)-140(3) to a null value. If each of the first input 402(1)-402(3) and the second input 404(1)-404(3) are determined by the AND-based logic gate 406(1)-406(3) to have matching data entries 136(1)-136(3) with the input data entry 136(0) in both the input record column $S_0$ and the additional record columns $S_1$-$S_K$, a high output of '1' is received by a respective increment circuit 412(1)-412(3). A high output of '1' results in the increment circuit 412(1)-412(3) indicating to the frequency indicator 138(1)-138(3) to increment the frequency counter 140(1)-140(3). As the next incoming data 112 is received in the input data entry 136(0) of the input record column $S_0$, and data is stored in the adjacent additional record columns $S_1$-$S_K$ as a result of the next incoming data 112 being received by the input record column $S_0$, a new first input 402(1)-402(3) and second input 404(1)-404(3) are then processed by the AND logic based gate 406(1)-406(3) to determine a new increment of the frequency counters 140(1)-140(3).

Figure 5:
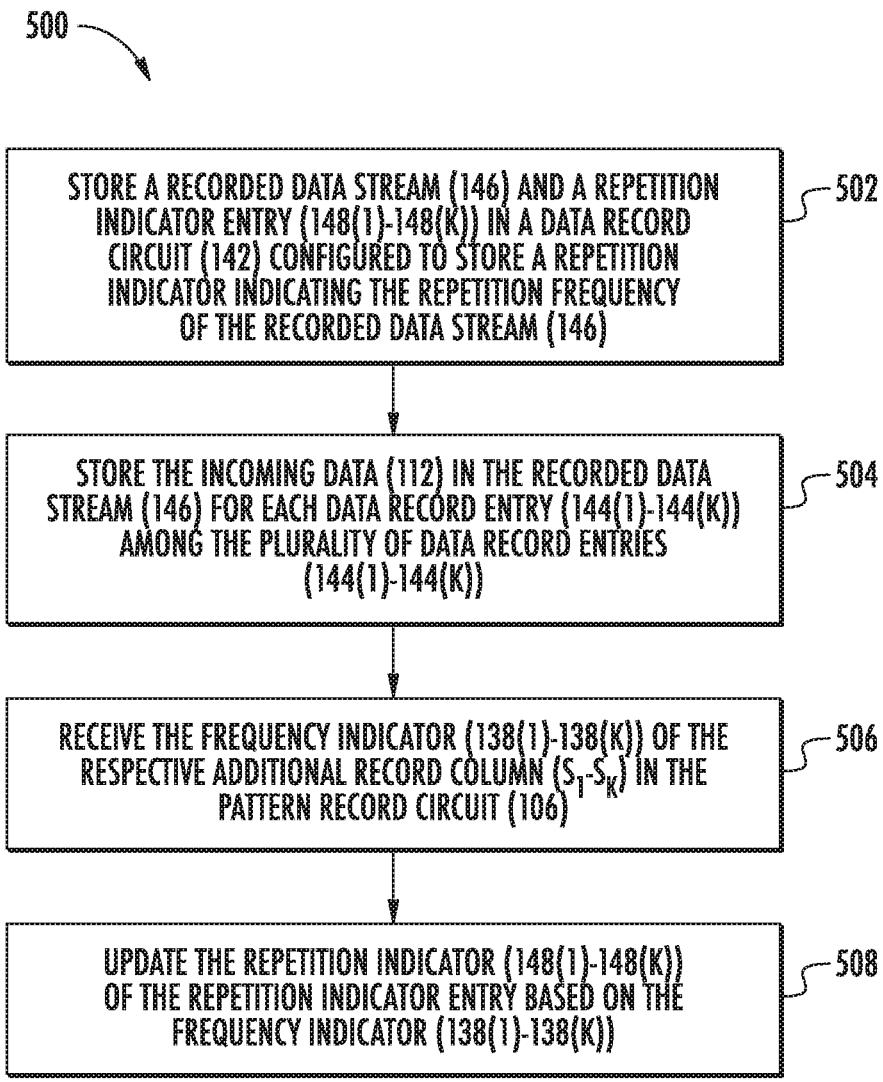
FIG. 5 is a flowchart illustrating an exemplary process of a data record circuit in the processor of FIG. 1 being updated to provide frequency indicator data to be consulted for a determined pattern based on the data recorded in the pattern record circuit.

FIG. 5 is a flowchart illustrating an exemplary process 500 of the data record circuit 142 in the processor 102 of FIG. 1 being updated to provide data from the frequency indicator 138(1)-138(K) to be consulted for a determined pattern based on the data recorded in the pattern record circuit 106. As discussed above, the pattern record circuit 106 is configured to determine if multiple repetitions of data in a data stream 114 have indeed formed a pattern. Accordingly, the process 500 includes storing a recorded data stream 146 and a repetition indicator entry 148(1)-148(K) in a data record circuit 142 configured to store a repetition indicator indicating the repetition frequency of the recorded data stream 146 (block 502 in FIG. 5). The stored repetition indicator in the repetition indicator entry 148(1)-148(K) is configured to indicate the repetition frequency of the recorded data stream 146 that includes a plurality of data record entries 144(1)-144(K) each corresponding to a respective additional record column $S_1$-$S_4$ among the plurality of additional record columns $S_1$-$S_4$ in the pattern record circuit 106. Accordingly, the recorded data stream 146 includes the pattern associated with the frequency counter 140(1)-140(K), and the amount of times the pattern is repeated. The data record circuit 142 is configured to store the incoming data 112 in the recorded data stream 146 in the data pattern entry 150(1)-150(K), for each data record entry 144(1)-144(K) among the plurality of data record entries 144(1)-144(K) (block 504 in FIG. 5). The data record circuit 142 can further include a matching data indicator entry 147(1)-147(K) as a program counter, for example, that is configured to identify the recorded data stream 146. The program counter is configured to update the incoming data 112 in the recorded data stream 146 received in the pattern record circuit 106, in order to further update the data record entries 144(1)-144(K) in the data record circuit 142. Accordingly, the program counter is configured to accurately match a pattern to the incoming data 112 in the instruction pipeline $I_0$-$I_N$. Additionally, the data record circuit 142 can then receive the frequency indicator 138(1)-138(K) of the respective additional record column $S_1$-$S_K$ in the pattern record circuit 106 (block 506 in FIG. 5). The frequency counter 140(1)-140(K) data is configured to update the data record circuit 142 as the frequency indicator 138(1)-138(K) determines additional matches of the data entries 136(0), 136(1)-136(3) in the input record column $S_0$ and the additional record columns $S_1$-$S_K$. Accordingly, the data record circuit 142 is configured to update the repetition indicator entry 148(1)-148(K) in the repetition indicator entry based on the frequency indicator 138(1)-138(K) (block 508 in FIG. 5).

Figure 6:
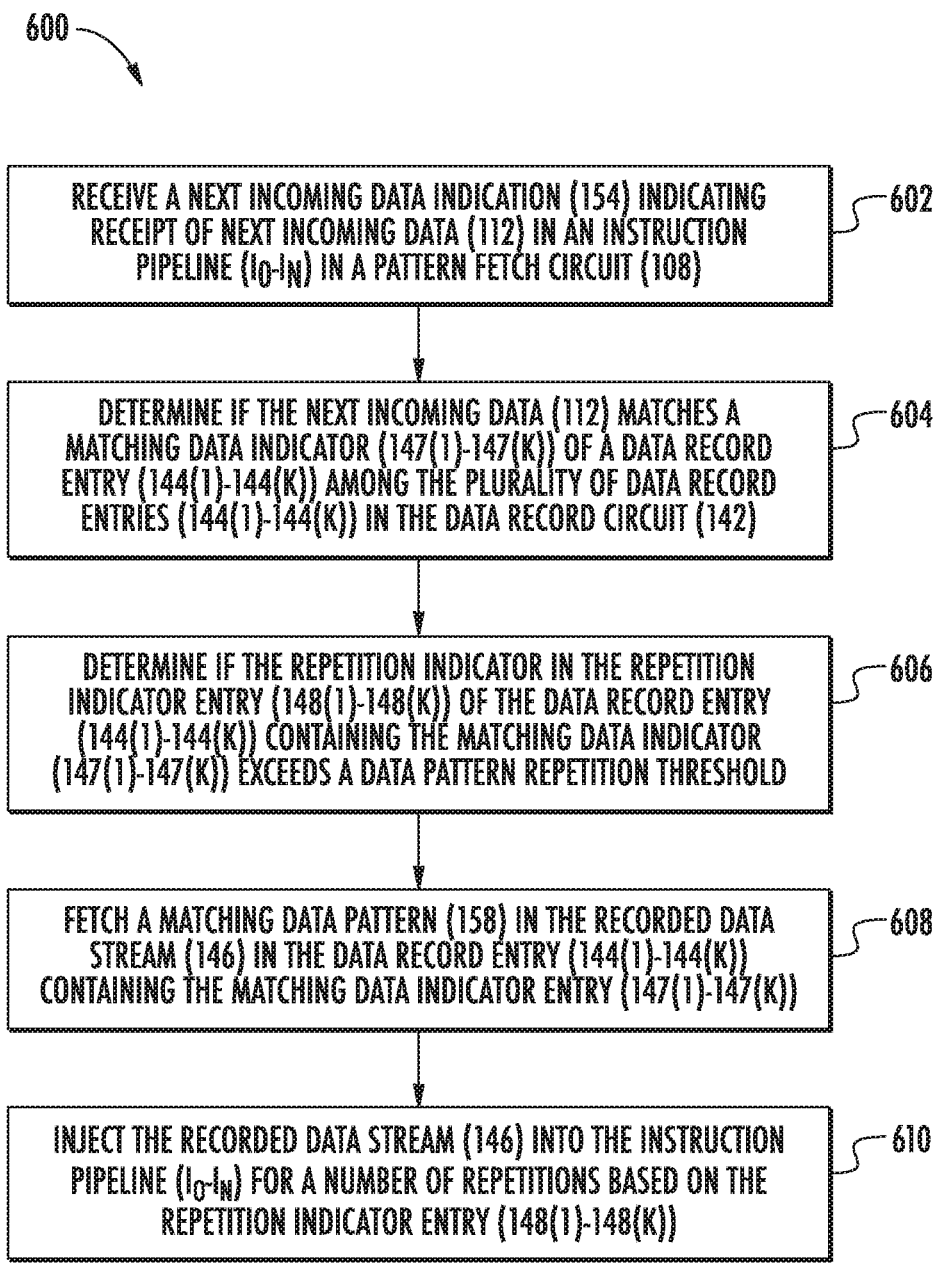
FIG. 6 is a flowchart illustrating an exemplary process of a pattern fetch circuit in the processor of FIG. 1, comparing newly fetched data to previously fetched data in the data record circuit and determining if the new fetched data is part of a previously recorded data pattern so as to fetch the previously recorded data into the instruction pipeline to avoid re-fetching.

FIG. 6 is a flowchart illustrating an exemplary process of the pattern fetch circuit 108 in the processor 102 of FIG. 1 comparing newly fetched data to previously fetched data in the data record circuit 142. Additionally, the pattern fetch circuit 108 is configured to determine if the newly fetched data is part of a previously recorded data pattern so as to fetch the previously recorded data into the instruction pipeline $I_0$-$I_N$ to avoid re-fetching data. In order to achieve this result, the process of the pattern fetch circuit 108 includes receiving a next incoming data indication 154 indicating the receipt of the next incoming data 112 in the instruction pipeline $I_0$-$I_N$ in the pattern fetch circuit 108 (block 602 in FIG. 6). The next incoming data indication 154 is used by the pattern fetch circuit 108 to reference the data record circuit 142 to determine if the next incoming data 112 matches a matching data indicator entry 147(1)-147(K) of a data record entry 144(1)-144(K) among the plurality of data record entries in the data record circuit 142 (block 604 in FIG. 6). In response to the next incoming data 112 matching the matching data indicator entry 147(1)-147(K) of the data record entry 144(1)-144(K) among the plurality of data record entries in the data record circuit 142, the process of the pattern fetch circuit 108 includes determining if the repetition indicator in the repetition indicator entry 148(1)-148(K) of the data record entry 144(1)-144(K) containing the matching data indicator entry 147(1)-147(K) exceeds a data pattern repetition threshold (block 606 in FIG. 6). If it is determined that the repetition indicator entry 148(1)-148(K) exceeds the data pattern repetition threshold, the process of a pattern fetch circuit 108 further includes fetching a matching data pattern 158 in the recorded data stream 146 of the data record entry 144(1)-144(K) containing the matching data indicator entry 147(1)-147(K) (block 608 in FIG. 6). Accordingly, the matching data indicator entry 147(1)-147(K) is able to be fetched based on the program counter that also is the start of the next incoming data 112, indicating start of a pattern that has already been stored in the data record circuit 142. Therefore, in order to prevent the instruction fetch circuit 116 from having to re-fetch multiple data already stored in the data record circuit 142, the pattern fetch circuit 108 injects the recorded data stream 146 into the instruction pipeline $I_0$-$I_N$ for a number of repetitions based on the repetition indicator entry 148(1)-148(K) (block 610 in FIG. 6).

In one example, the pattern fetch circuit 108 can cause the instruction fetch circuit 116 to stop prefetching additional instructions 110 for the duration of the pattern repetition. Accordingly, if the repetition indicator in the repetition indicator entry 148(1)-148(K) of the data record entry 144(1)-144(K) associated with the matching data indicator entry 147(1)-147(K) exceeds the data pattern repetition threshold, the processor 102 can be instructed to stop fetching the next incoming data 112. As such, the processor 102 will halt fetching next incoming data 112 from the pattern fetch circuit 108 into the instruction pipeline $I_0$-$I_N$ for the duration of the number of repetitions of the recorded data stream 146.

In another example, optionally, the pattern fetch circuit 108 can be configured to select a recorded data stream 146 in the data record circuit 142, to inject into the instruction pipeline $I_0$-$I_N$ based on the strength of the repetition indicator entry 148(1)-148(K). In the instance where the repetition indicator is strong for multiple data record entries 144(1)-144(K) in the data record circuit 142, the pattern fetch circuit 108 is configured to determine if the next incoming data 112 from the data stream 114 matches a plurality of data indicators of a in the data record circuit 142. If the next incoming data 112 in the data stream 114 matches the plurality of data indicators of a plurality of data record entries 144(1)-144 (K), the pattern fetch circuit 108 can further include determining if the repetition indicator in the plurality of repetition indicator entries 148(1)-148(K) of the data record entries 144(1)-144(K) containing the matching data indicator entries 147(1)-147(K) exceeds a data pattern repetition threshold. If the data pattern threshold is exceeded, the process of the pattern record circuit 106 can include fetching the recorded data stream 146 in the data record entry 144(1)-144(K) having the largest repetition indicator entry 148(1)-148(K). Additionally, the pattern record circuit 106 is configured to inject the recorded data stream 146 in the data record entry 144(1)-144(K) of the largest repetition indicator entry 148(1)-148(K) into the instruction pipeline $I_0$-$I_N$. If the data record entry 144(1)-144(K) of the largest repetition indicator entry 148(1)-148(K) has multiple repetitions as indicated by the repetition indicator in the repetition indicator entry 148(1)-148(K), the pattern is repeated for the number of repetitions of the value of the repetition indicator entry 148(1)-148(K).

FIG. 7 is a diagram of the exemplary data record circuit 142 that can be provided in the processor 102 in FIG. 1 to determine that the ascertained pattern does not match an issued instruction 110I, and flush the instruction pipeline $I_0$-$I_N$ and/or the FIFO table circuit 200 of FIG. 2. If a flush of the instruction pipeline $I_0$-$I_N$ occurs, it may be desired to flush the data entries 136(0)-136(3) in the input record column $S_0$ and the additional record columns $S_1$-$S_K$ and the entries in the data record circuit 142 as invalid data. This data can be filled in again from new incoming data 112 after the flush occurs to detect repetitive patterns in the incoming data 112. As discussed previously, the instruction fetch circuit 116 is configured to provide the instructions 110 as fetched instructions 110F into the one or more instruction pipelines $I_0$-$I_N$ as the data stream 114 to be pre-processed, and decoded by the instruction decode circuit 126 prior to the fetched instructions 110 reaching the execution circuit 122 to be executed as executed instructions 110E. Determining if a flush event 704(1)-704(2) has occurred begins with the execution circuit 122 executing a plurality of instructions 110 fetched into the instruction pipeline $I_0$-$I_N$. If the execution circuit 122 encounters an error or a precise interrupt that interferes with the execution of an issued instruction 110I, the execution circuit 122 is configured to generate a pipeline flush indicator 702 in response to the precise interrupt. If the precise interrupt is not addressed, there is a risk of delayed execution of instructions 110 issued to the execution circuit 122 among a plurality of instructions 110 in the instruction pipelines $I_0$-$I_N$. The precise interrupt indicates that a likelihood that a pattern received via a matching data pattern 158 fetched from the recorded data stream 146 into the instruction pipeline $I_0$-$I_N$, upon receiving a next incoming data indication 154, was incorrectly identified or includes data that has caused a delay in execution.

Accordingly, to flush out data stored in the pattern record circuit 106 and data record circuit 142 as invalid to then start over with recording incoming data 112 to detect repetitive patterns, the pipeline flush indicator 702 can be sent to the data record circuit 142 and/or the pattern record circuit 106. Accordingly, the pattern record circuit 106 in response to the pipeline flush indicator 702 is configured to flush the input data entry 136(0) in the input record column $S_0$. Additionally, the pattern record circuit 106 is configured to flush the input data entries 136(1)-136(K) in the additional record columns $S_1$-$S_K$ and the frequency indicator 138(1)-138(K) in each of the one or more additional record columns $S_1$-$S_K$, in response to the pipeline flush indicator 702. The pipeline flush indicator 702 is configured to flush the data record entries 144(1)-144(K) in the data record circuit 142. Accordingly, the repetition indicator entry 148(1)-148(K), the data pattern entry 150(1)-150(K), and the matching data indicator entry 147(1)-147(K) are each reset in response to the pipeline flush indicator 702. Upon flushing the pattern record circuit 106 and/or the data record circuit 142, the pattern fetch circuit 108 can continue the fetching operation of providing instructions 110 into the one or more instruction pipelines $I_0$-$I_N$ as a data stream 114. The pattern record circuit 106 can then restart the process of storing data in the input record column $S_0$ and the one or more additional record columns $S_1$-$S_K$. Similarly, the data record circuit 142 restarts the process of storing data in the repetition indicator entry 148(1)-148(K), the data pattern entry 150(1)-150(K), and the matching data indicator entry 147(1)-147(K).

FIG. 8 is a flowchart illustrating an exemplary process 800 of flushing the pattern record circuit 106 and the data record circuit 142 in the processor 102 in FIG. 1 in response to a flush event 704(1)-704(2). As discussed above, the instruction processing circuit 104 can include an execution circuit 122 that is configured to execute data 112 as decoded instructions 110D, received from the issue circuit 132 ready to be executed by the execution circuit 122. A flush of the pattern record circuit 106 or data record circuit 142 is needed in cases where re-fetched data via the pattern fetch circuit 108 from the data record circuit 142 does not match the next incoming data 112 to be executed. Additionally, a flush can occur where the data 112 in the execution circuit 122 encounters an error or a precise interrupt. Accordingly, the process of responding to a flush event 704(1)-704(2) begins with the execution circuit 122 executing a plurality of instructions 110 fetched into the instruction pipeline $I_0$-$I_N$ (block 802 in FIG. 8). If the execution circuit 122 encounters a precise interrupt occurring in an instruction 110 among the plurality of instructions, the pipeline flush indicator 702 is generated (804 in FIG. 6). The pipeline flush indicator 702 is configured to be sent to the pattern record circuit 106 and/or the data record circuit 142. Specifically, in the case of the pattern record circuit 106 receiving the pipeline flush indicator 702, the pattern record circuit 106 is configured to flush the input data entry 136(0) in the input record column $S_0$ (block 806 in FIG. 8). Additionally, the pattern record circuit 106 is configured to flush the input data entry 136(1)-136(K) in each of the additional record columns $S_1$-$S_K$, and each of the frequency indicators 138(1)-138(K) in each of the additional record columns $S_1$-$S_K$ (block 808 in FIG. 8). Flushing of each of the data entries 136(0)-136(K) in the pattern record circuit 106 provides for a complete reset in preparation for the next incoming data 112 entering the input record column $S_0$. The flushing of the pattern record circuit 106 prevents additional precise interrupts from occurring, and allows the pattern record circuit 106 to receive next incoming data 112 that may be representative of a new set of data representing a change in potential patterns. Optionally, in response to the pipeline flush indicator 702 being received, the pattern record circuit 106 is configured to flush the repetition indicator entry 148(1)-148(K) in each of the plurality of data record entries 144(1)-144(K) in the data record circuit 142 in order to account for new repetitions determined by the frequency indicators 138(1)-138(K) of the pattern record circuit 106 (block 810 in FIG. 8). Accordingly, the pattern fetch circuit 108 is configured to then receive updated data record entry 144(1)-144(K) data from the data record circuit 142. As such, upon the pattern fetch circuit 108 receiving the next incoming data indication 154, the data received from the data record circuit 142, if there is a matching data entry, will be updated to represent the most current next incoming data 112 received by the pattern record circuit 106 and fetched by the instruction fetch circuit 116.

FIG. 9 is a block diagram of an exemplary processor-based system 900 that includes a processor 902 (e.g., a microprocessor) that includes an instruction processing circuit 904 including a pattern record circuit 905, a data record circuit 906, and a pattern fetch circuit 907, for detecting a repeated pattern in an instruction pipeline $I_0$-$I_N$ of the processor 902 to reduce repeated fetching of data. For example, the processor 902 in FIG. 9 could be the processor 102 in FIG. 1. As another example, the instruction processing circuit 904 could be the instruction processing circuit 104 in FIG. 1. As another example, the pattern record circuit 905 could be the pattern record circuit 106 in FIG. 1. As another example, the data record circuit 906 could be the data record circuit 142 in FIG. 1. In yet another example, the pattern fetch circuit 907 could be the pattern fetch circuit in 108 in FIG. 1.

The processor-based system 900 may be a circuit or circuits included in an electronic board card, such as a printed circuit board (PCB), a server, a personal computer, a desktop computer, a laptop computer, a personal digital assistant (PDA), a computing pad, a mobile device, or any other device, and may represent, for example, a server, or a user's computer. In this example, the processor-based system 900 includes the processor 902. The processor 902 represents one or more general-purpose processing circuits, such as a microprocessor, central processing unit, or the like. More particularly, the processor 902 may be an EDGE instruction set microprocessor, or other processor implementing an instruction set that supports explicit consumer naming for communicating produced values resulting from execution of producer instructions. The processor 902 is configured to execute processing logic in instructions for performing the operations and steps discussed herein. In this example, the processor 902 includes an instruction cache 908 for temporary, fast access memory storage of instructions accessible by the instruction processing circuit 904.

Fetched or pre-fetched instructions from a memory, such as from a system memory 910 over a system bus 912, are stored in the instruction cache 908. The instruction processing circuit 904 is configured to process instructions fetched into the instruction cache 908 and process the instructions for execution.

The processor 902 and the system memory 910 are coupled to the system bus 912 and can intercouple peripheral devices included in the processor-based system 900. As is well known, the processor 902 communicates with these other devices by exchanging address, control, and data information over the system bus 912. For example, the processor 902 can communicate bus transaction requests to a memory controller 914 in the system memory 910 as an example of a slave device. Although not illustrated in FIG. 9, multiple system buses 912 could be provided, wherein each system bus constitutes a different fabric. In this example, the memory controller 914 is configured to provide memory access requests to a memory array 916 in the system memory 910. The memory array 916 includes an array of storage bit cells for storing data. The system memory 910 may be a read-only memory (ROM), flash memory, dynamic random-access memory (DRAM), such as synchronous DRAM (SDRAM), etc., and a static memory (e.g., flash memory, static random-access memory (SRAM), etc.), as non-limiting examples.

Other devices can be connected to the system bus 912. As illustrated in FIG. 9, these devices can include the system memory 910, one or more input device(s) 918, one or more output device(s) 920, a modem 922, and one or more display controllers 924, as examples. The input device(s) 918 can include any type of input device, including but not limited to input keys, switches, voice processors, etc. The output device(s) 920 can include any type of output device, including but not limited to audio, video, other visual indicators, etc. The modem 922 can be any device configured to allow exchange of data to and from a network 926. The network 926 can be any type of network, including but not limited to a wired or wireless network, a private or public network, a local area network (LAN), a wireless local area network (WLAN), a wide area network (WAN), a BLUETOOTH™ network, and the Internet. The modem 922 can be configured to support any type of communications protocol desired. The processor 902 may also be configured to access the display controller(s) 924 over the system bus 912 to control information sent to one or more displays 928. The display(s) 928 can include any type of display, including but not limited to a cathode ray tube (CRT), a liquid crystal display (LCD), a plasma display, etc.

The processor-based system 900 in FIG. 9 may include a set of instructions 930 to be executed by the processor 902 for any application desired according to the instructions. The instructions 930 may be stored in the system memory 910, processor 902, and/or instruction cache 908 as examples of a non-transitory computer-readable medium 932. The instructions 930 may also reside, completely or at least partially, within the system memory 910 and/or within the processor 902 during their execution. The instructions 930 may further be transmitted or received over the network 926 via the modem 922, such that the network 926 includes the computer-readable medium 932.

While the computer-readable medium 932 is shown in an exemplary embodiment to be a single medium, the term "computer-readable medium" should be taken to include a single medium or multiple media (e.g., a centralized or distributed database, and/or associated caches and servers) that stores the one or more sets of instructions. The term "computer-readable medium" shall also be taken to include any medium that is capable of storing, encoding, or carrying a set of instructions for execution by the processing device and that causes the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A processor, comprising:
an instruction processing circuit configured to fetch data into an instruction pipeline as a data stream; and
a pattern record circuit comprising an input record column comprising an input data entry, and one or more additional record columns each comprising a data entry and a frequency indicator;
the pattern record circuit configured to:
receive a next incoming data from the data stream; and
in response to receiving the next incoming data from the data stream:
store data in the data entry of the one or more additional record columns into a data entry of a respective available adjacent additional record column among the one or more additional record columns;
store data in the input data entry of the input record column to an additional record column among the one or more additional record columns adjacent to the input record column;
store the next incoming data in the input data entry in the input record column as data in the input data entry; and
in response to the data stored in the data entry of at least one additional record column among the one or more additional record columns matching the data stored in the input data entry, update a frequency indicator of the at least one additional record column among the one or more additional record columns matching the data stored in the input data entry to a repetition frequency state indicating a repetition frequency of the next incoming data in the data stream.

2. The processor of claim 1, wherein each additional record column is assigned to a respective data repetition frequency in the data stream based on its distance from the input record column.

3. The processor of claim 1, wherein the instruction processing circuit is configured to fetch a plurality of instructions into the instruction pipeline as the data stream.

4. The processor of claim 1, wherein the instruction processing circuit is configured to fetch a plurality of source data used for processing one or more instructions, into the instruction pipeline as the data stream.

5. The processor of claim 1, wherein the pattern record circuit comprises a first in, first out (FIFO) table circuit; and
the pattern record circuit is configured to, in response to receiving the next incoming data from the data stream:
shift the data in the input data entry of the input record column to the additional record column among the one or more additional record columns adjacent to the input record column; and
shift the data in the data entry of each of the one or more additional record columns into the data entry of the respective available adjacent additional record column among the one or more additional record columns.

6. The processor of claim 1, wherein:
the frequency indicator of each additional record column among the one or more additional record columns comprises a frequency counter; and
the pattern record circuit is configured to, in response to the data stored in the data entry of the at least one additional record column among the one or more additional record columns matching the data stored in the input data entry, increment the frequency indicator of the at least one additional record column among the one or more additional record columns matching the data stored in the input data entry.

7. The processor of claim 6, wherein the pattern record circuit is further configured to, in response to the data stored in the data entry of the at least one additional record column among the one or more additional record columns not matching the data stored in the input data entry, reset the frequency indicator of the at least one additional record column among the one or more additional record columns not matching the data stored in the input data entry to a no repetition frequency state to indicate no repetition frequency of the next incoming data in the data stream.

8. The processor of claim 1, further comprising a data record circuit coupled to the pattern record circuit, the data record circuit comprising:
a plurality of data record entries each corresponding to a respective additional record column among the one or more additional record columns in the pattern record circuit,
each data record entry among the plurality of data record entries comprising a data stream record configured to store a recorded data stream, and a repetition indicator entry configured to store a repetition indicator indicating the repetition frequency of the recorded data stream; and
the data record circuit configured to, for each data record entry among the plurality of data record entries:
store the next incoming data in the recorded data stream in the data stream record;
receive the frequency indicator of the respective additional record column in the pattern record circuit; and
update the repetition indicator in the repetition indicator entry based on the frequency indicator.

9. The processor of claim 8, wherein:
the pattern record circuit is further configured to, in response to the data stored in the data entry of the at least one additional record column among the one or more additional record columns not matching the data stored in the input data entry, reset the frequency indicator of the at least one additional record column among the one or more additional record columns not matching the data stored in the input data entry to a no repetition frequency state to indicate no repetition frequency of the next incoming data in the data stream; and
the data record circuit is further configured to, for each data record entry among the plurality of data record entries, reset the repetition indicator in the repetition indicator entry, in response to the reset of the frequency indicator in the at least one additional record column among the one or more additional record columns not matching the data stored in the input data entry to the no repetition frequency state in the pattern record circuit.

10. The processor of claim 8, wherein the data record circuit is configured to, for each data record entry among the plurality of data record entries, update the repetition indicator in the repetition indicator entry based on the frequency indicator, by being configured to:
divide the frequency indicator of the respective additional record column in the pattern record circuit by a distance between the respective additional record column and the input record column.

11. The processor of claim 8, wherein each data record entry among the plurality of data record entries further comprises a data indicator configured to identify data in the data stream.

12. The processor of claim 8, wherein:
the instruction processing circuit further comprises an execution circuit configured to:
execute a plurality of instructions fetched into the instruction pipeline; and
generate a pipeline flush indicator in response to a precise interrupt occurring in response to executing an instruction among the plurality of instructions; and
the pattern record circuit is further configured to:
in response to the pipeline flush indicator:
flush the data entry in the input record column;
flush the data entry and the frequency indicator in each of the one or more additional record columns; and
flush the repetition indicator in each of the plurality of data record entries.

13. The processor of claim 11, wherein:
the instruction processing circuit is configured to fetch a plurality of instructions from a program code into the instruction pipeline as the data stream; and
each data record entry among the plurality of data record entries comprises the data indicator comprising an instruction indicator configured to identify an instruction in the program code.

14. The processor of claim 11, further comprising a pattern fetch circuit configured to:
receive a data indicator of a second next incoming data in the instruction pipeline;
determine if the second next incoming data matches a data indicator of a data record entry among the plurality of data record entries in the data record circuit; and
in response to the second next incoming data matching a data indicator of a data record entry among the plurality of data record entries in the data record circuit:
determine if the repetition indicator in the repetition indicator entry of the data record entry containing the matching data indicator exceeds a data pattern repetition threshold; and
in response to the repetition indicator in the repetition indicator entry of the data record entry containing the matching data indicator exceeding the data pattern repetition threshold:
fetch the recorded data stream in the data record entry containing the matching data indicator; and
inject the recorded data stream into the instruction pipeline for a number of repetitions based on the repetition indicator.

15. The processor of claim 14, wherein the pattern fetch circuit is further configured to, in response to the repetition indicator in the repetition indicator entry of the data record entry containing the matching data indicator exceeding the data pattern repetition threshold:
cause the processor to halt fetching of new incoming data into the instruction pipeline for a duration of the number of repetitions of the recorded data stream.

16. The processor of claim 14, wherein the pattern fetch circuit is configured to:
determine if the second next incoming data matches a plurality of data indicators among the plurality of data record entries in the data record circuit;
in response to the second next incoming data matching the plurality of data indicators of a plurality of data record entries among the plurality of data record entries in the data record circuit:
determine if the repetition indicator in a plurality of repetition indicator entries of the plurality of data record entries containing the matching data indicator exceeds the data pattern repetition threshold; and
in response to more than one repetition indicator in more than one data record entry among the plurality of repetition indicator entries of the plurality data record entries containing the matching data indicator exceeding the data pattern repetition threshold:
fetch the recorded data stream in the data record entry among the more than one data record entries having a largest repetition indicator; and
inject the recorded data stream in the data record entry among the more than one data record entries having the largest repetition indicator, into the instruction pipeline for a number of repetitions based on the repetition indicator.

17. The processor of claim 1, wherein:
the instruction processing circuit further comprises an execution circuit configured to:
execute a plurality of instructions fetched into the instruction pipeline; and
generate a pipeline flush indicator in response to a precise interrupt occurring in response to executing an instruction among the plurality of instructions; and
the pattern record circuit is further configured to:
in response to the pipeline flush indicator:
flush the data entry in the input record column; and
flush the data entry and the frequency indicator in each of the one or more additional record columns.

18. A method of detecting a repetitive pattern in an instruction pipeline of a processor, comprising:
receiving a next incoming data from a data stream fetched into the instruction pipeline;
storing the next incoming data in an input data entry in an input record column in a pattern record circuit;
storing data in the input data entry of the input record column in a data entry in an additional record column among one or more additional record columns in the pattern record circuit adjacent to the input record column;
storing data in a data entry of the one or more additional record columns into a data entry of a respective available adjacent additional record column among the one or more additional record columns;
in response to determining the data stored in the data entry of at least one additional record column among the one or more additional record columns matches the data in the input data entry; and
in response to the data stored in the data entry of the at least one additional record column among the one or more additional record columns matching the data stored in the input data entry:
updating a frequency indicator of the at least one additional record column among the one or more additional record columns matching the data stored in the input data entry to a repetition frequency state indicating a repetition frequency of the next incoming data in the data stream.

19. The method of claim 18, further comprising:

storing a recorded data stream and a repetition indicator entry in a data record circuit configured to store a repetition indicator indicating the repetition frequency of the recorded data stream comprising a plurality of data record entries each corresponding to a respective additional record column among the one or more additional record columns in the pattern record circuit, each data record entry among the plurality of data record entries comprising a data stream record;

storing the next incoming data in the recorded data stream in the data stream record for each data record entry among the plurality of data record entries;

receiving the frequency indicator of the respective additional record column in the pattern record circuit; and updating the repetition indicator in the repetition indicator entry based on the frequency indicator.

20. The method of claim 19, further comprising:

receiving a data indicator of the next incoming data in the instruction pipeline in a pattern fetch circuit;

in response to determining the next incoming data matches a data indicator of a data record entry among the plurality of data record entries in the data record circuit;

in response to the next incoming data matching a data indicator of a data record entry among the plurality of data record entries in the data record circuit:

in response to determining the repetition indicator in the repetition indicator entry of the data record entry containing the matching data indicator exceeds a data pattern repetition threshold; and in response to the repetition indicator in the repetition indicator entry of the data record entry containing the matching data indicator exceeding the data pattern repetition threshold:

fetch the recorded data stream in the data record entry containing the matching data indicator; and inject the recorded data stream into the instruction pipeline for a number of repetitions based on the repetition indicator.

21. The method of claim 20, further comprising:

in response to the repetition indicator in the repetition indicator entry of the data record entry containing the matching data indicator exceeding the data pattern repetition threshold:

causing the processor to halt fetching of new incoming data, from the pattern fetch circuit, into the instruction pipeline for a duration of the number of repetitions of the recorded data stream.

22. The method of claim 20, further comprising:

in response to determining the next incoming data matches a plurality of data indicators of a plurality of data record entries among the plurality of data record entries in the data record circuit;

in response to the next incoming data matching the plurality of data indicators of a plurality of data record entries among the plurality of data record entries in the data record circuit:

in response to determining the repetition indicator in a plurality of repetition indicator entries of the plurality of data record entries containing the matching data indicator exceeds the data pattern repetition threshold; and in response to more than one repetition indicator in more than one data record entry among the plurality of repetition indicator entries of the plurality of data record entries containing the matching data indicator exceeding the data pattern repetition threshold:

fetching the recorded data stream in the data record entry among the more than one data record entries having a largest repetition indicator; and injecting the recorded data stream in the data record entry among the more than one data record entries having the largest repetition indicator, into the instruction pipeline for a number of repetitions based on the repetition indicator.

\* \* \* \* \*